(12) United States Patent
Harari et al.

(10) Patent No.: US 9,851,920 B2
(45) Date of Patent: Dec. 26, 2017

(54) SYSTEM AND METHOD FOR REMOVING HASH TABLE ENTRIES

(71) Applicant: FREESCALE SEMICONDUCTOR, INC., Austin, TX (US)

(72) Inventors: Yuval Harari, Tel-Aviv (IL); Evgeni Ginzburg, Petah Tikva (IL); Adi Katz, Ramat Gan (IL); Shai Koren, Raanana (IL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/954,039

(22) Filed: Nov. 30, 2015

(65) Prior Publication Data

US 2017/0153847 A1 Jun. 1, 2017

(51) Int. Cl.
*G06F 3/06* (2006.01)
(52) U.S. Cl.
CPC .......... *G06F 3/0652* (2013.01); *G06F 3/0608* (2013.01); *G06F 3/0619* (2013.01); *G06F 3/0644* (2013.01); *G06F 3/0673* (2013.01)
(58) Field of Classification Search
CPC ................................................. G06F 17/3033
See application file for complete search history.

(56) References Cited

U.S. PATENT DOCUMENTS

| 5,893,120 A * | 4/1999 | Nemes .............. G06F 17/30949 |
| 7,249,352 B2 | 7/2007 | Fleming et al. |
| 2015/0317183 A1* | 11/2015 | Little ................ G06F 17/30362 |
| | | 707/703 |

OTHER PUBLICATIONS

Arpaci Dusseau: "Lock-Based Concurrent Data Structures", University of Wisconsin-Madison, XP-002768811, Dec. 31, 2014, pp. 1-13.
83.248.163.42: "Lazy deletion", Wikipedia, XP-002768810, Jan. 5, 2015, p. 1.
Peter Flass: "Hash table", Wikipedia, XP-2768809, Nov. 26, 2015, pp. 1-14.

* cited by examiner

*Primary Examiner* — Edward Dudek, Jr.

(57) ABSTRACT

A data processing device includes a hash table management module that sequentially steps through linear address space of the hash table to identify hash chain in sequential address order. Each identified hash chain is evaluated, before identifying a next hash chain, to remove any entries marked for deletion.

18 Claims, 13 Drawing Sheets

SYSTEM AND METHOD FOR REMOVING HASH TABLE ENTRIES

FIELD OF THE DISCLOSURE

The present disclosure relates generally to data processing systems and methods, and more particularly to hash tables in data processors.

BACKGROUND

In data processing systems, a hash table is a data structure that can map keys to values. A key can be any block of data in a data processing system. The mapped value is information about a block of data that the data processing system stores for future use. In order to use a hash table, memory can be allocated at which an array of hash table entries of equal size are stored. Information about blocks of data is stored in the hash table entries. A hash function is used by the data processing system to determine which entry in the hash table contains information about a particular block of data. To use a hash function, the data processing system provides the block of data, e.g., the key, as an input to the hash function. The hash function computes a value based on the block of data. This result is used as the address of a hash table entry in the hash table. A common implementation is to treat the hash table in memory as an array and to interpret a result from a hash function as an index into the hash table array.

Ideally, a hash function will produce a unique result for each block of data provided as an input. In practice, however, most hash functions will for some different blocks of data generate the same result. This situation is referred to as a hash collision. One method of dealing with collisions is to create hash chains by creating a separate hash table entry for each block of data that causes a collision and linking the entries having the same hash function result to each other as a linked list data structure. Thus, information associated with a second data block having the same hash function result is stored at a second hash table entry that is unused, e.g., no hash function result has been generated that is equal to the index to the unused entry, and the index of the second hash table entry is stored into a field of the first hash table result. Information for subsequent data blocks having the same hash function result is stored in a similar way at unused hash table entries, with the address of a new hash table entry stored in a field of an already existing hash table entry in the chain.

During continued operation of a data processing system, hash table entries may need to be deleted from a hash table. Because multiple entities can be accessing a hash table in parallel, cleanup routines are called that scan through a hash table linearly, and removes those hash table entries marked for deletion. One issue with such a hash table clean-up routine is that the routine is not guaranteed to remove all deleted entries from a particular hash chain without locking the entire hash table, during which time the hash table can not be accessed. Additionally, having to call the hash routine requires additional attention by the application using the hash tables. Because hash table performance may affect the overall performance of a data processing system, an effective ability to delete hash table entries is desirable.

BRIEF DESCRIPTION OF THE DRAWINGS

The present disclosure may be better understood, and its numerous features and advantages made apparent to those skilled in the art by referencing the accompanying drawings. It will be appreciated that for simplicity and clarity of illustration, elements illustrated in the Figures have not necessarily been drawn to scale. For example, the dimensions of some elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

In accordance with an embodiment of the present disclosure, a data processing device includes a hash table cleanup module that can periodically scan a hash table to remove entries that have been marked for deletion. According to an embodiment, that the cleanup module can delete all hash table entries that are marked for deletion by implementing a single scan of the hash table that identifies each head entry sequentially in linear address order by stepping sequentially through each hash table entry location. Upon identifying each head entry, which identifies the start of a hash chain, a hash chain processing module locks the hash chain from further modification, and evaluates each entry of the hash chain to identify deleted entries, e.g., the entries are sequentially evaluated based upon the order in which entries of the hash chain are linked.

Upon identifying an entry of the hash chain that is marked as deleted, the hash chain processing module unlocks the hash chain, requests deletion of the entry, and relocks the hash chain. After the entry is deleted, the hash chain processing module continues stepping through the hash chain to determine if additional deleted entries exist in the hash chain. Upon evaluating all hash chains, the hash chain processing module resumes its single scan of the hash table for additional head entries. Evaluating all entries of a hash chain sequentially to remove hash chain entries marked for deletion ensures that after the last entry of a hash chain has been evaluated that the hash chain will contain only valid entries. Thus, avoiding the need to maintain deleted entries in a hash chain for the entire duration between cleaning up the hash table.

Figure 1:
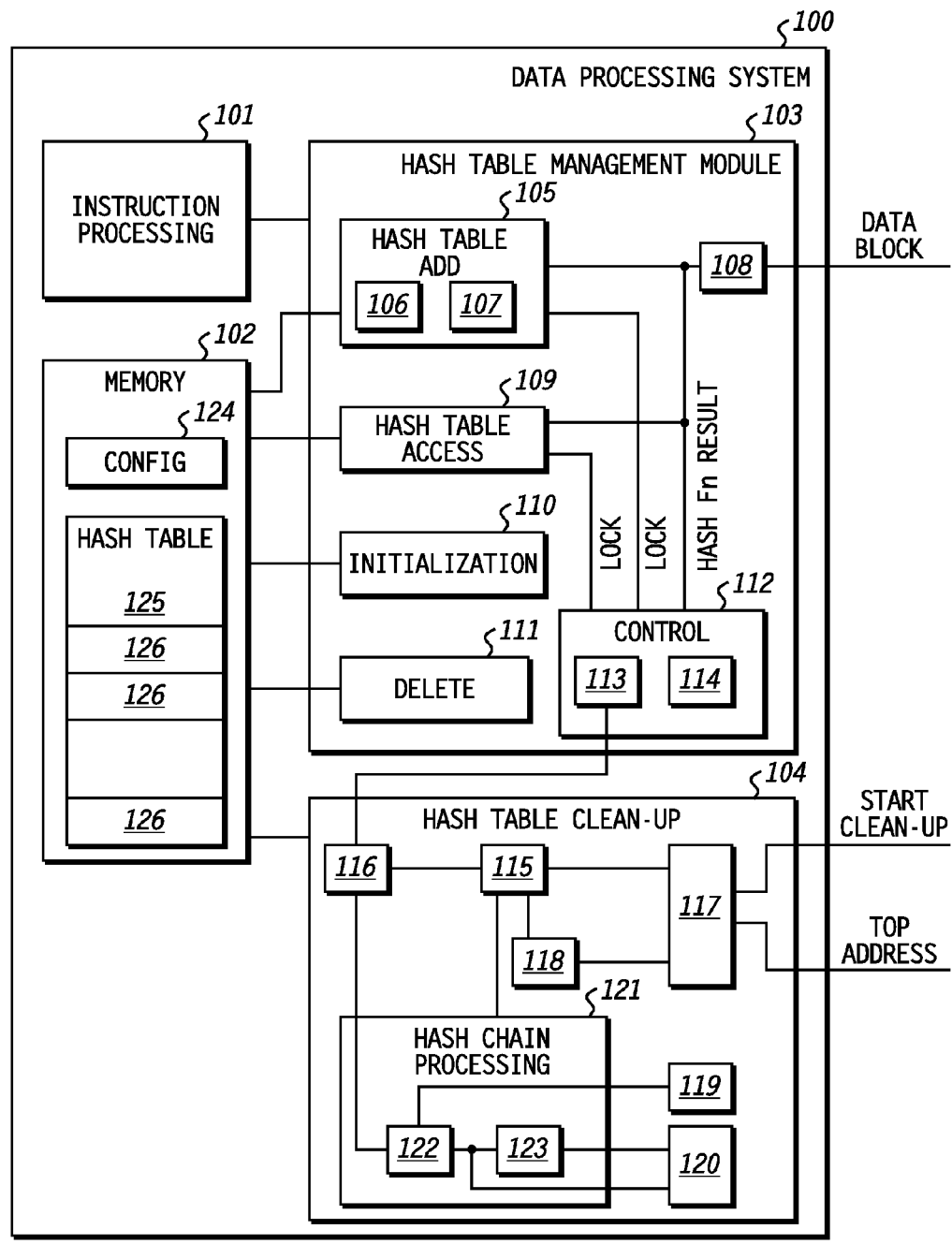
FIG. 1 is an illustration of a data processing system according to an embodiment of the present disclosure.

FIG. 1 illustrates an embodiment of data processing system 100 having instruction processing module 101, memory module 102, hash table management module 103, and cleanup circuitry 104. Instruction processing module 101 is connected to memory module 102 (not shown) to allow software executing on instruction processing module 101 to store program and data information. Instruction processing module 101 is further connected to hash table management module 103 to request operations on hash tables. Hash table management module 103 is connected to memory module 102 to create and manage data information associated with hash tables as will be described herein.

Memory module 102 stores configuration information 124 and hash table 125. Configuration information 124 includes information associated with hash table 125. In an embodiment, configuration information 124 can include information indicating the size of a hash table, whether entries in hash table 125 are valid, e.g., currently allocated to a hash table entry, and whether a hash table entry location is locked. For example, configuration information 124 can include information indicating whether a particular one of hash table entries 126 is locked. For example, configuration information 124 can include one bit for each hash table entry 126 location in hash table 125. When a bit in configuration information 124 corresponding to a particular hash table entry 126 is set, the entry is locked. When the bit is clear, the entry is unlocked. Additionally, configuration information 124 stores the size of the hash table.

Memory module 102 is configured to store one or more hash tables including hash table 125. Hash table 125 occupies a set of memory locations at successive physical addresses within memory module 102. Hash table 125 has a lower extreme physical address, e.g., a smallest address, and an upper extreme physical address, e.g., a largest address, identifying storage locations within memory module 102. The lower extreme physical address of hash table 125 is a base address of hash table 125 and will be indicated herein with the values 0 or 0x0. A hash table physical address in hash table 125 is converted to a physical address in memory module 102 by adding the base address of hash table 125 to the hash table physical address. It will be appreciated that the lower extreme physical address is not necessarily the lower extreme physical address of memory module 102.

Hash table 125 includes a number of fixed size hash table entries 126. Each hash table entry can occupy a single memory location or a fixed number of contiguous memory locations. As the hash table entries 126 are of a fixed size, hash table 125 can be treated an array of hash table entries, and a hash table entry can be identified by an index value. In an embodiment, an index value of a hash table entry is a hash function result generated by hash value generation module 108; and the physical address of the hash table entry can be computed by multiplying the size of a hash table entry 126 by the index value and adding the product to a base address of hash table 125.

Hash table management module 103 includes hash entry add module 105, hash value generation module 108, access module 109, initialization module 110, delete module 111 and control module 112.

Hash value generation module 108 receives a data block, for example from instruction processing module 101 or memory module 102, and computes a hash function result based on the data block. Hash value generation module 108 is connected to hash entry add module 105, hash table access module 109 and control module 112 to supply hash function results.

As used herein, the terms "hash value" or "hash function result" are used synonymously to refer to a value computed by applying a hash function to a block of data. A hash function is a series of mathematical operations applied to the data block. Numerous hash functions with a variety of mathematical properties are possible. For a particular application in a data processing system, a hash function will be selected during the design of the application. The result of applying a hash function to a block of data is the hash value for the block. The hash value of a block of data comprises fewer bits than the block of data and can be used as an index into a table, for example into hash table 125. As hash values have fewer bits than the data blocks from which they are generated, a plurality of different data blocks can have the same hash value. Thus, it may be the case that the hash value of a particular block of data has the same hash value as a different block of data already having an entry in hash table 125.

Hash table initialization module 110 is connected to memory module 102 and is configured to initialize hash tables at memory module 102. In an embodiment, initializing a hash table includes setting initial values for hash table entries 126 and various configuration information 124. For example, hash table initialization module 110 can store information at configuration information 124 indicating that all hash table entries 126 are invalid and store indicators at hash table entries 126 indicating that the entries contain no valid information associated with data blocks.

Hash entry add module 105 is connected to memory module 102 in order to access hash table 125. In response to receiving a hash function result from hash value generation module 108, the hash entry add module 105 creates a new hash table entry. According to an embodiment, hash entry add module 105 adds hash table entries to a hash table stored in memory module 102, and includes a create new hash chain module 106 and an add entry to hash chain module 107. The create new hash chain module generates an initial entry of a new hash chain, referred to as the head entry, that includes storing various information about a data block at an entry location of the hash table to create a head entry of a new hash chain. The entry location is based upon the index value, e.g., the hash function result, computed for the data block by hash value generation module 108. Create new hash chain module 106 can also include circuitry that moves hash table entries as needed, as will be described herein. The add entry to hash chain module 107 is used in response to a collision to add information about a new data block to a new hash table entry, and links the new entry into an existing hash chain as will be described herein. Hash entry add module 105 also provides a lock request to control module 112 to request a particular entry of the hash table be locked.

Hash table access module 109 retrieves information about a data block from an existing entry of a hash table. For example, hash table access module 109 receives a hash function result for a data block from hash value generation module 108, accesses hash table 125 and retrieves data associated with the data block from a hash table entry 126. Thus, during a read operation, the hash value can be used to access a location in the hash table where an existing hash entry resides in order to access information stored at the hash entry. During a write operation, the hash table management module can create new entries in the hash table. Delete module 111 is connected to memory module 102 and is configured to set a delete indicator in a hash table entry 126 in response to a request to delete a hash table entry. For example, a software program executing on instruction processing module 102 can determine that a data block is no longer needed and send a request to delete a hash table entry 126 associated with the data block to hash table management module 103, which will set an indicator at the hash table entry 126 being deleted.

Control module 112 includes lock circuitry 113 and other modules as needed to control operation of the hash table manage module 103. Lock circuitry 113 implements locking and unlocking of portions of hash table 125 for hash table management module 103. Information indicating a hash chain is locked can be stored at the head entry of a locked hash chain, at each hash table entry of a locked chain, at lock request module 116, the like, and combinations thereof.

Control module 112 receives lock requests from hash entry add module 105, hash table access module 109 and lock request circuitry 116.

Portions of hash table 125 are locked by control module 112 using lock circuitry 113 in order to prevent corruption of information stored in hash table 125 that can result from the hash table management module 103 or instruction processing module 101 accessing hash table 125 at the same time as another module. According to an embodiment, an entry of hash table 125 that has been locked by a particular entity can only be unlocked by that particular entity. Locking can be accomplished by various means well known in the art. In an embodiment, instruction processing module 101 and hash management module 106 implement a cooperative locking protocol, wherein configuration information 124 includes a lock flag for each hash table entry 126. A lock flag in configuration information 124 indicates that an entry in hash table 125 is locked regardless of whether the entry contains valid hash table information. For example, a module can lock a hash table entry in preparation for writing valid data into the entry. After valid data is written the entry is unlocked. In response to a request to lock a hash table entry, control module 112 sets a bit in configuration information 124 corresponding to the hash table entry, thus locking the requested hash table entry. Setting a lock flag in configuration information 124 for a head entry of a hash chain will result in all of the hash table entries included in the hash chain also being locked. This can be accomplished explicitly, wherein each of the other hash table entries of the hash chain are also marked in configuration information 124 as locked. For example, locking a second entry in the hash chain is performed by following a link address in the head entry to locate the second hash table entry of the hash chain and setting a lock bit in configuration information corresponding to the second hash table entry of the hash chain. Subsequent hash table entries are locked in a similar way, following a link address from a previous entry and setting a lock bit in configuration information 124 until a hash table entry is reached which indicates that there are no further hash table entries in the hash chain.

Alternatively, a hash chain can be locked implicitly, wherein before allowing an entity to modify a hash table entry that it has not been locked, and, therefore, is not a head entry, memory protecting circuitry will first checks the lock flag in configuration information 124 of the head entry of a hash chain which includes the hash table entry. If the lock flag is set, the module must wait until the flag is clear before proceeding. If the lock flag is not set, the module wishing to make the modification sets the flag and modifies the hash table entry.

If an entity requesting the lock of a hash chain entry needs to modify the entry, it must first request the entry be unlocked. After a module has completed modifying the hash table entry the module clears the lock flag of the entry. Locking circuitry 113 implements the locking and unlocking of portions of hash table 125 for hash table management module 103. Instruction processing module 101 can implement locking in software or by means of dedicated circuitry. In another embodiment, setting the lock bit for a head entry of a hash chain does not lock the entire hash chain. In order to lock the hash chain, each hash table entry is locked individually. Locking a hash chain includes setting a lock bit of a head entry of the hash chain in configuration information 124. It will be appreciated that in various embodiments, a memory controller (not shown) or other memory protection unit (not shown) interfaces with assists the hash table management module 103 and assists in implementing locking and unlocking of hash table entries 126.

Cleanup circuitry 104 includes head detect module 115, lock request module 116, storage locations 117 and 119, increment module 118, update module 120, hash chain processing module 121, deleted entry detect module 122, and deallocate entry module 123. Cleanup circuitry 104 scans hash table 125 and deletes hash table entries that have been marked by instruction processing module 101 for deletion, thus freeing these entries to store new entry information. The scanning performed by cleanup circuitry 104 can be performed at the same time as instruction processing module 101 continues with other operations that may involve accessing hash table 125. The scanning performed by the cleanup circuitry 104 can occur in response to an explicit clean up request, which can be generated by the instruction processor. In another embodiment, the cleanup circuitry 104 is configured to operate in a background mode, wherein it is continuously operational, along with other features of the system 100.

The characteristics of the scanning performed by cleanup circuitry 104 have an effect on the performance of data processing system 100 as both hash management module 103 and instruction processor module 101 may need to access memory module 102 concurrently. For example, performance of the system can be affected by how frequently scanning is performed, any wait time between processing of individual hash table entries, the order in which hash table entries are processed, and what portions of hash table 125 must be locked for the scan. A particular procedure for scanning hash table 125 by cleanup circuitry 104 follows.

Head entry detect (head detect) module 115 is connected to storage location 117, lock request module 116, increment module 118, hash chain processing module 121 and memory module 102. Storage location 117 contains a value, such as an index, indicating a hash table entry 126 in hash table 125. In response to the storage location 117 receiving a start clean-up indicator, for example from control module 112 or from instruction processing module 101, storage location 117 is set to an extreme physical address of hash table 125, presumed for purposes of discussion to be a lowest value of the memory range, and is labeled as the Top Address in FIG. 1. In response to receiving an indicator from the increment module 118, the value of storage location 117 is incremented to indicate a next in-address-order entry. According to a particular embodiment, the increment module 118 can implement a time period delay between increments of the storage location 117 to prevent the cleanup module 104 from exercising too much continuous control over the hash table 300. For example, the time period can be stored at a storage location that is programmable by a user via the instruction processing module.

The ability to implement a delay between increments can be additionally useful when the hash table clean-up module 104 is operating in a background mode, discussed in greater detail below, during which the hash table cleanup module 104 operating concurrently with other entities of the system 100 that can access the hash table, or in the case of a continuous background mode, the hash table module is continuously operational, e.g., in an endless loop. The ability to control how often the hash table cleanup module 104 can access memory 102 facilitates its running in background mode. Otherwise, without such a delay, the cleanup module 104 would use too much memory access bandwidth to make background mode feasible. The ability to operate in background mode reduces the amount of overhead the application itself needs to perform, as once the hash table clean-up module is configured to operate in background mode, the application does not need to provide any additional cleanup requests to the cleanup module 104. It will be appreciated, however, that even when operating in background mode, cleanup module 104 can receive and respond to cleanup requests from the instruction processing module, which would set the value stored at storage location 117 to be the extreme address as described above.

Storage location 119 contains a value indicating a hash table entry of hash table 125 to be processed by hash chain processing module 121, as will be described in greater detail below. During operation, a current value stored at storage location 119 is provided to deleted entry detect module 121 as part of a request to remove an entry from a hash chain. The value of storage location 119 is updated by update module 120.

During operation, in response to receiving a start cleanup indicator, the head detect module 115 will evaluate the extreme address stored at storage location 117. If the hash table entry identified by the address storage location 117 is not a head entry, e.g., the first entry of a hash chain, the head detect module 115 transmits an indicator to increment module 118 that results in the address at storage location 117 being incremented to point to the next in sequence hash table entry location. As described above, the increment module can wait a predetermined amount of time before incrementing the value at storage location 117, thus controlling the rate at which the cleanup module 104 needs to access memory 102. The predetermined amount of time, e.g., a time period, can be stored at a storage location of clean-up module 104 (not shown) that is programmable by the instruction processing module 101.

Each time the storage location is incremented, the head detect module 105 will evaluate the newly stored address at storage location 117 to determine if it is a head entry. In response to the storage location 117 identifying a head entry, the head detect module 115 provides an indicator to lock request module 116 to lock the hash chain associated with the head entry, which will be the value currently stored at storage location 117, and provides an indicator to hash chain processing module 121 to remove from the hash chain all hash table entries that are marked for deletion.

In response to an indication from hash chain processing module 121 that processing of the hash chain is complete, head detect module 115 provides an indication to lock request module 116 to unlock the hash chain. In addition, head detect module provides the increment indicator to increment module 118 to increment storage location 117, which allows head detect module 115 to again determine if the value stored at storage location 117 identifies the location of a head element of the hash table. By stepping though the memory locations of a hash table in a linear manner, each head entry is identified, and the hash elements associated with the chain corresponding to the head entry are evaluated by hash chain processing module 121, resulting in hash chain entries marked for deletion being removed.

Hash chain processing module 121 includes deleted entry detect module 122 and deallocate entry module 123. In response to receiving an indicator from head detect module 115 that a head entry has been identified, hash chain processing module 121 stores the location of the identified head entry, e.g., the value of storage location 117, at storage location 119. Deleted entry detect module 122 then determines whether the hash table entry 126 indicated by storage location 119 is marked for deletion. In response to the hash table entry 126 not being marked for deletion, deleted entry detect module 122 provides an indicator to update module 120, which in response to receiving the indicator will update storage location 119 with the value of a link field of the current hash table entry 126, which indicates the location of the next hash table entry. If instead, a hash table entry is marked for deletion, the deleted entry detect module 122 provides an indicator to lock request module 116 requesting that a hash chain including the hash table entry 126 be unlocked, and sends a delete request to deallocate entry module 123, which will remove the entry from the current chain, so that the entry is available to store a new hash table entry. Once all entries of a chain are evaluated by the hash chain processing module, the value of storage location 117 is incremented, and head detect module 115 continues operation as described previously.

In another embodiment, once all entries of a hash chain are evaluated, the current hash chain can be unlocked and further cleanup is delayed for time period before proceeding. Thus preventing the cleanup module 104 from exercising too continuous control over the hash table 300. For example, the time period can be stored at a storage location that is programmable by a user via the instruction processing module. It will be appreciated that this delay can be used instead of the delay implemented by increment module 118, or in conjunction with the delay implemented by increment module 118.

Figure 2:
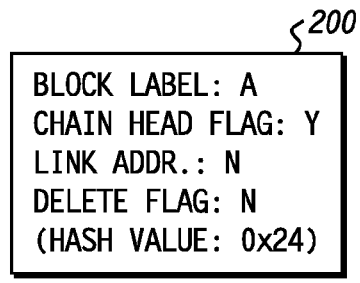
FIG. 2 is a schematic representation of a hash table entry according to an embodiment of the present disclosure.

FIG. 2 illustrates a hash table entry according to an embodiment. Hash table entry 200 includes a block label, a chain head flag, a link address, a delete flag and a hash value. The block label is information that either represents the data block that the hash function used to generate the hash value of the entry, or an indicator where the data block is stored, e.g., a pointer to the address in memory of the data block associated with the hash table entry.

The chain head flag and link address values are used in the creation and management of chains of hash table entries. As discussed previously, a chain of hash table entries, referred to herein as a hash chain, can be used to resolve hash collisions. Hash tables entries in a particular hash chain are associated with data blocks, usually different data blocks, having the same hash value. One of the hash table entries in the hash chain is designated as the head entry of the hash chain. The head entry is designated by having its chain head flag set. In an embodiment, the head entry of the hash chain is the hash table entry located at the location in hash table 125 corresponding to the hash value of the associated data block. In such an embodiment, an explicit chain head flag can be omitted and the condition of a hash table entry being the head entry of a hash chain can be determined by the hash value associated with the hash table entry being equal to the address of the hash table entry in a hash table.

The link address field of a hash table entry is linking information of the hash chain that either includes a particular hash value that indicates another hash table entry having the same hash value. The link address field in a head entry of a hash chain points to a next hash table entry of the chain. The link address field of the second entry can, in turn, point to yet another entry in the chain. The chain of linked hash table entries continues until there are no further hash table entries in the chain. The last entry in the chain has a link address field that indicates no further entries, as indicated by the designator "None", herein. In an embodiment, a link address value that is a valid address in the hash table indicates another hash table entry and a link address value that is not a valid address in the hash table indicates that no further hash table entries in the chain.

The delete flag of a hash table entry is set to indicate that a hash table entry is no longer needed and that it may be deleted. In an embodiment, the delete flag is set by instruction processing module 101 directly, or by making a request to the hash table management module 103, in which case the delete flag is set by the hash entry delete module 111. In other embodiments, flags indicating operations on a hash table entry other than delete may be indicated by flags in a hash table entry. The processing of hash table entries with other flags is substantially similar to the processing of a delete flag as described herein.

Figure 3:
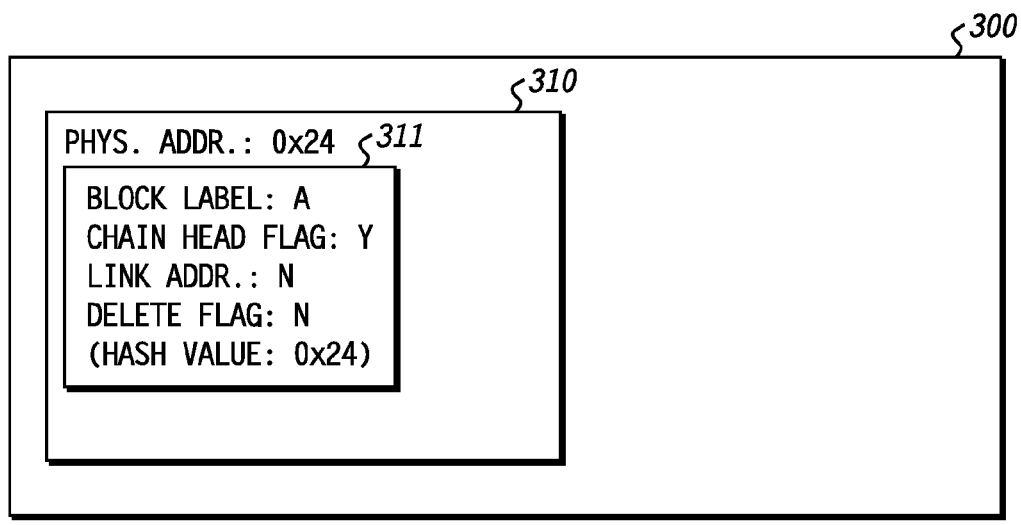
FIGS. 3-7 are schematic representations of hash chains in a hash table.

FIG. 3 illustrates hash table 300 containing a single hash chain 310 having one hash table entry 311. Hash table entry 311 is associated with a data block A as indicated by the block label. The chain head flag is set, indicating that hash table entry 311 is the head of a hash chain. The hash value of data block A is 0x24 as indicated by the hash value of hash table entry 311. For convenience of discussion herein, it is presumed that there is a one-to-one correspondence between physical addresses of the hash table 300 and hash table entries. Therefore, the physical address of hash table entry 311 in hash table 300 is also 0x24, which represents the head entry of hash chain 310 of hash table entries sharing the hash value 0x24. The link address field of hash table entry 311 does not point to another hash table entry, thus hash chain 310 has only one hash table entry.

An example of adding hash table entry 311 to hash table 300 will serve to illustrate the relationship among the values in hash table entry 311. Beginning with an empty hash table, hash table entry 311 can be added to hash table 300 by following a sequence of steps. The hash value of the data block A is computed using hash value generation module 108. In this example, the hash value computed for data block A is 0x24. Hash entry add module 105 examines address 0x24 of hash table 300 to determine if the present hash value is unique to the hash table, or if it represents a collision. Since hash table 300 is empty prior to the addition of hash table entry 311, it is determined that the hash value 0x24 is unique, e.g., there is not valid entry at the memory location 0x24. Thus, the create new hash chain module 106, of hash entry add circuitry 105, adds hash table entry 311 to hash table 300 at address 0x24. As hash table entry 311 is the first entry for a hash chain, it is stored at an address equal to the hash value of its associated data block, and the chain head flag of the hash entry is set. No other hash table entries for hash value 0x24 exist, so the link address of hash table entry 311 is set to indicate no further entries. No request has been made to delete hash table entry 311, thus its delete flag is set to indicate that no delete is requested.

Figure 4:
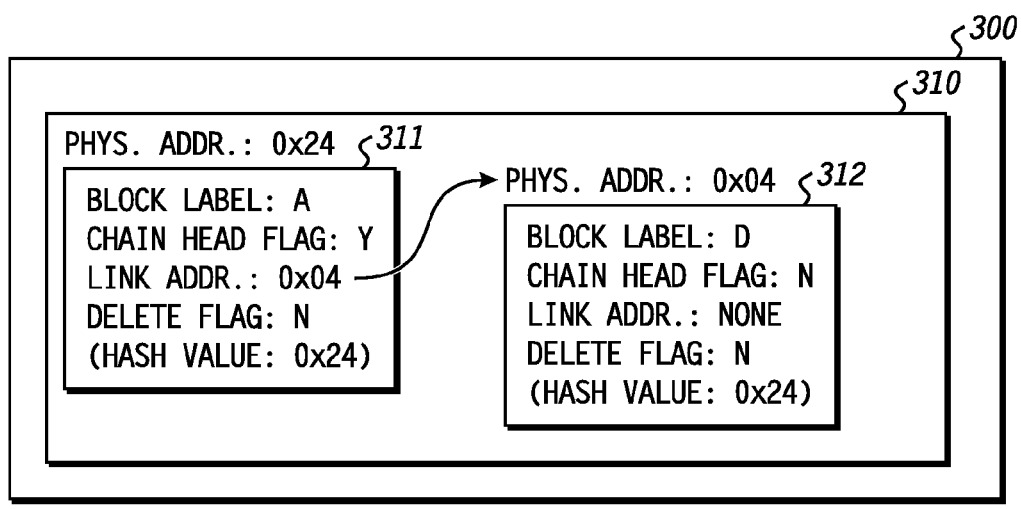

FIG. 4 shows hash table 300 containing hash chain 310 having two hash table entries 311 and 312. Hash table entry 312 is associated with data block D. Data block D has a hash value of 0x24, thus the hash value field of hash table entry 312 is 0x24. This is the same hash value as for data block A associated with hash table entry 311, thus a hash collision has occurred. Hash table entry 312 cannot be stored at address 0x24 in hash table 300 because hash table entry 311 is stored at address 0x24. To resolve the collision and store both hash table entries, the add entry to hash chain module 107 of the hash table add module 105 is used to add an entry to the existing hash chain 300. In the present example, physical address 0x04 has been selected as the location for the entry being added, e.g., entry 312. The link address of hash table entry 311 is modified to the value 0x04, thus pointing to hash table entry 312, which is the next entry in the hash chain. The link address of hash table entry 312 is set to indicate no further hash table entries in hash chain 310. The value of the chain head flag of hash table entry 312 indicates that hash table entry 312 is not the head of hash chain 300. As discussed previously, the condition of not being the head entry of a hash chain can be indicated by an explicit flag in a hash table entry or can be inferred from the physical address of hash table entry 312 not being the same as the hash value of hash table entry 312.

Figure 5:
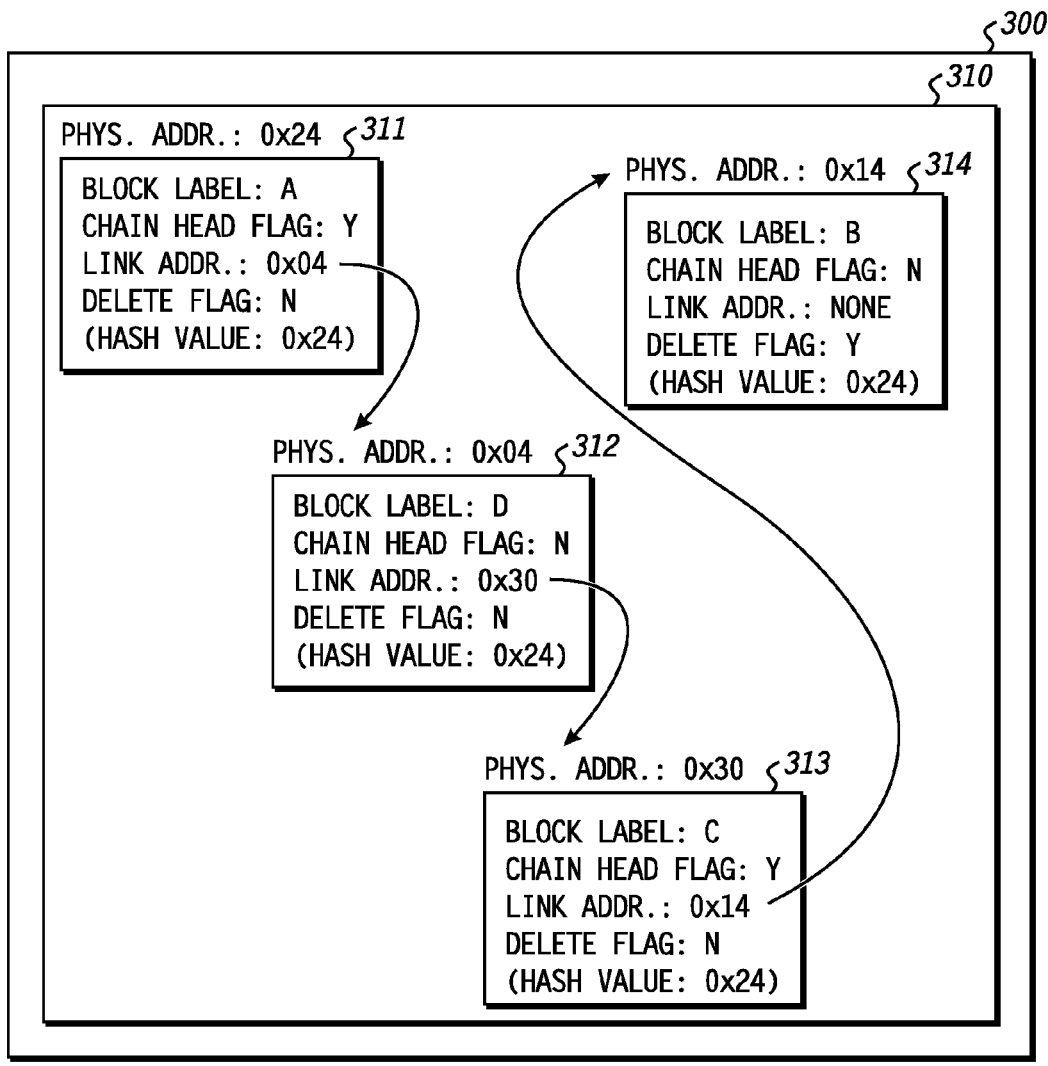

FIG. 5 shows hash table 300 after the addition of hash table entries 313 and 314 to hash chain 300. As with hash table entry 312, hash table entries 313 and 314 are associated with data blocks having a hash value of 0x24. Address 0x24 is occupied by hash table entry 311, thus hash table entries 313 and 314 cannot be stored at address 0x24. Hash table entries 313 and 314 must be stored at unused physical addresses in hash table 300 and linked into hash chain 310 as described with respect to hash table entry 312. As illustrated, the entry 313 is stored at physical address 0x30 and the entry 314 is stored at physical address 0x14.

Figure 6:
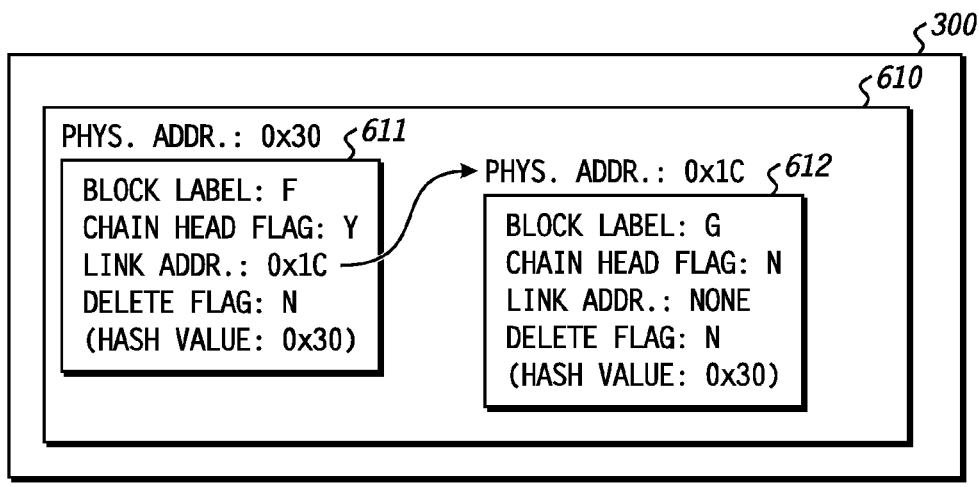

FIG. 6 shows hash chain 610 that comprises hash table entries associated with data blocks having a hash value of 0x30. Hash table entry 610 is associated with a data block F and hash table entry 612 is associated with a data block G. It will be appreciated that because the address 0x30 was already occupied with hash entry 313 of hash table 300 (FIG. 5), which is associated with the hash value 0x24, that the create new hash chain module needs to change the physical address where hash entry 313 resides before creating the head entry of hash chain 610 at physical address 0x30. It should be noted that the need to place hash table entry 611 at an already occupied address differs from the situation illustrated at FIG. 4. At FIG. 4, both hash table entries represent data blocks having the hash value 0x24 but only one block can be placed at the physical address corresponding to the hash value 0x24. When attempting to add hash table entry 611 to hash table 300, which is a head entry, physical address 0x30 is occupied by hash table entry 313, which is associated with a data block having a hash value of 0x24. Thus, hash table entry 313 was added to hash table 300 at a physical address not equal to the hash value of its associated data block; which in this example was selected to be physical address 0x30. To accommodate the addition of hash chain 610 to hash table 300, therefore, hash table entry 313 must be moved to a different physical address by the create new hash chain module 106.

Figure 7:
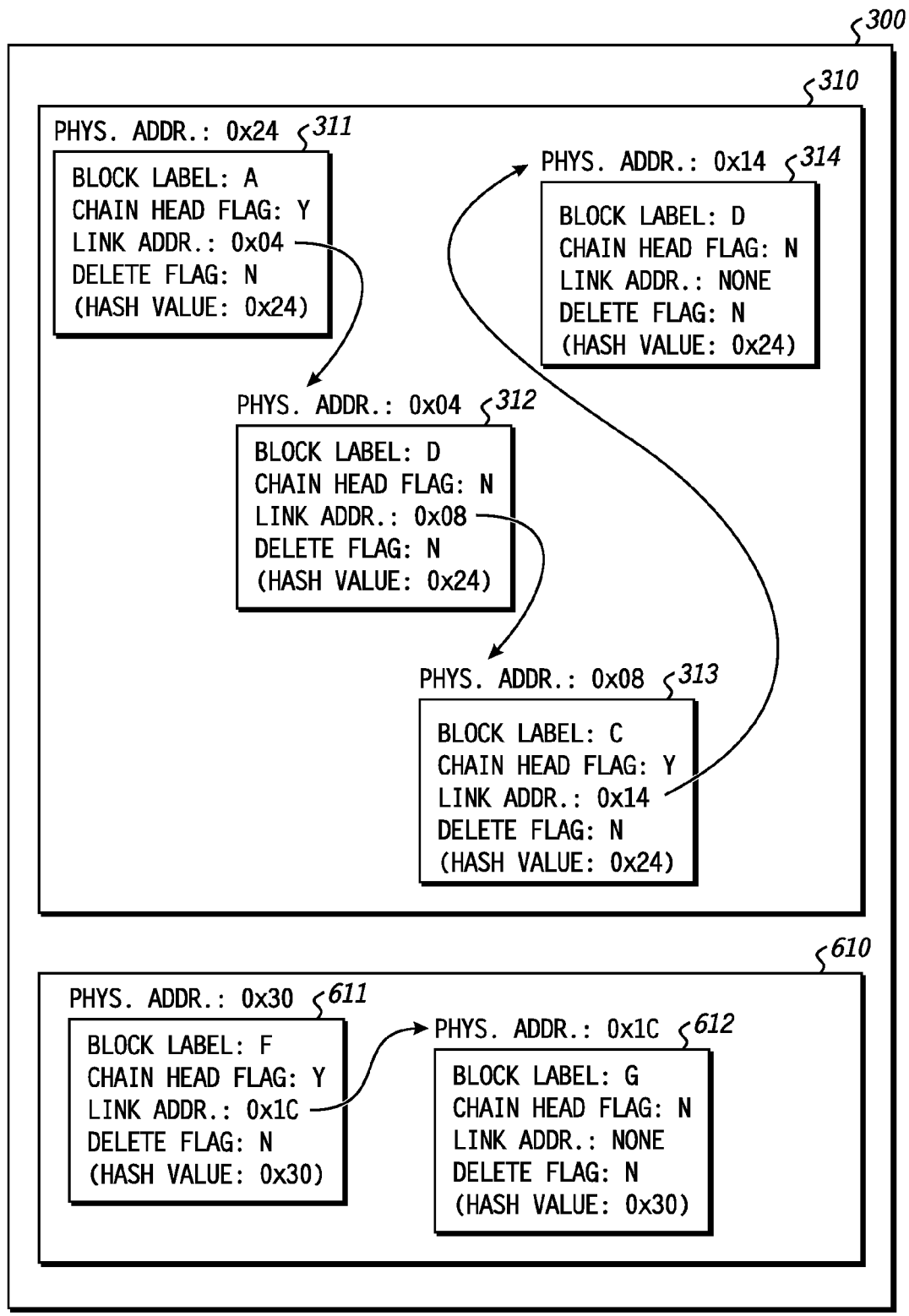

FIG. 7 shows hash table 300 after the addition of hash table entries 611 and 612 of hash chain 610. Hash table entry 313 has been removed from physical address 0x30 and added at physical address 0x08. In this example, physical address 0x08 was previously unused. The link address of hash table entry 312 has been changed from 0x30 to 0x08 so that the link address continue to point to hash table entry 313. Hash table entry 611 has been added to hash table 300 at physical address 0x30. After the addition of hash table entry 611, hash table entry 612 is added as described previously to complete hash chain 610.

Those skilled in the art will appreciate that changes in the structure of hash table 300 in this manner present hazards in multiprocessing or multiprogramming systems. For example, a first processor using hash table entry 313 at a time that a second processor moves the hash table entry 313 can encounter errors or use incorrect data. For this reason, a locking scheme is implemented as described herein to prevent more than one processor from accessing portions of hash chains during certain operations.

A second hazard presented by moving hash table entry 313 is that it may be missed by operations on hash table 300 that process hash table entries in the order of physical addresses. For example, a scan of hash table 300 that begins at the lowest physical address of the table and examines each hash table entry in sequence may be examining a hash table entry at physical address 0x2C when hash table entry 313 is moved from physical address 0x30 to physical address 0x08. When the scan progresses to physical address 0x30 it will examine hash table entry 611. Hash table entry 313 has been moved to physical address 0x08, which has already been scanned. Thus, the scan misses hash table entry 313. A method for guaranteeing that a scan of hash table entries examines all entries in a single scan will be described herein.

Figure 8:
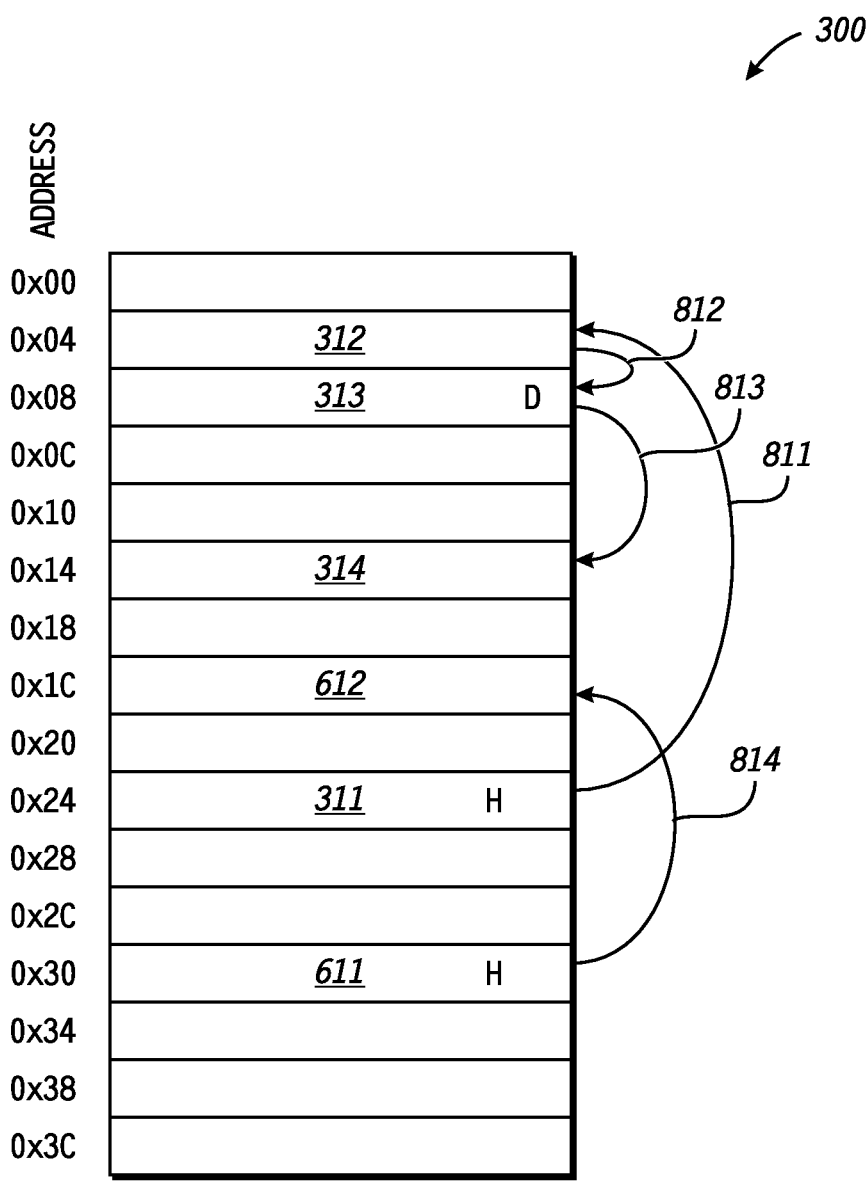
FIG. 8 is a diagram a hash table in a memory of a data processing system.

FIG. 8 shows hash table 300 as illustrated at FIG. 7 mapped into physical memory, with the exception that entry 313 as illustrated at FIG. 8 has been marked for deletion. Hash table entry 311 is the head entry of hash chain 300 of hash table entries having hash value 0x24. As the head entry of the chain, hash table entry is located at physical address 0x24. Hash table entry 611 is the head entry of hash chain 610 of hash table entries having hash value 0x30 and is located at physical address 0x30. Hash table entries 311 and 611 are each labeled with the letter "H" to indicate that the chain head indicator of the hash table entry is set. Hash table entry 313 resides at physical address 0x08, and is labeled with the letter "D" to indicate that the delete flag of the entry is set, indicating that the hash table entry is to be deleted. Arrows 811-814 at FIG. 8 represent the link address fields of hash table entries 311-313 and 611. For example, as shown at FIG. 7, the link address field of hash table entry 311 is 0x04. Physical address 0x04 is the address of hash table entry 312. At FIG. 8, arrow 811 points from hash table entry 311 at physical address 0x24 to hash table entry 312 at physical address 0x04 to represent the link address field of hash table entry 311. Similarly, arrow 812 represents the link address field of hash table entry 312 pointing to hash table entry 313, and arrow 813 represents the link address field of hash table entry 313 pointing to hash table entry 314. There is no arrow leaving hash table entry 314 as it is the last hash table entry of hash chain 310. Arrow 814 represents the link address field of hash table entry 611 pointing to hash table entry 612, and hash table entry 612 has no arrow as it is the final hash table entry in hash chain 610.

As used herein, "increment" means advance the value of an address location to point to the next hash table entry following the entry pointed to by the current value of the address location. In an embodiment, advancing the value is done by adding an amount equal to the size of a hash table entry to the current scan address value. For example, in the example described herein hash table entries have a size of 4 bytes, thus the value 4 is added to the value of an address location in order to advance the value to point to the next hash table entry. In another embodiment, advancing is done by subtracting an amount equal to the size of a hash table entry to the current register value.

As discussed previously, scanning hash table entries in sequential hash table order and evaluating each entry to determine if it is marked for deletion can miss hash table entries in a multiprocessor system in which hash table entries are moved in a hash table while the scanning operation is in progress. Tables 1 and 2 illustrate pseudo code that implements an exemplary operation of cleanup module 108. In particular, Table 1 illustrates a procedure for sequentially scanning memory of a hash table searching for head entries of hash chains; and Table 2 illustrates a procedure for evaluating identified hash chains to remove hash table entries marked for deletion. The operation of the procedures shown at Tables 1 and 2 will be described with respect to FIGS. 9-18.

Figure 9:
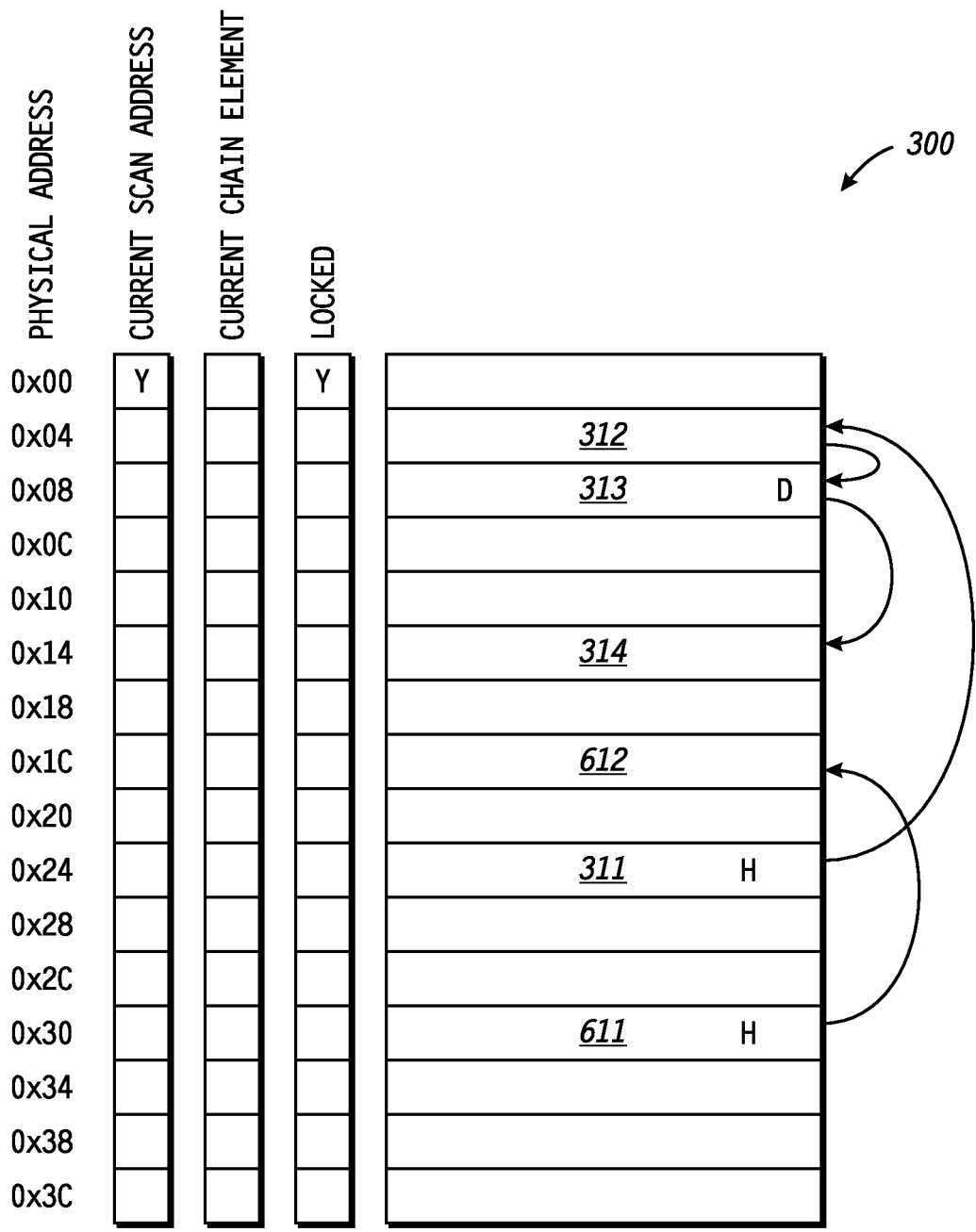
FIGS. 9-16 are diagrams a hash table in a memory of a data processing system with addition information for performing a scan operation on the hash table.

FIG. 9 illustrates the hash table 300 of FIG. 8 with additional information indicating various state information of the hash table entries. The Current Scan Address column of FIGS. 9-17 indicates with a "Y" designator which one of the hash table entries is the current scan. This can correspond to the value stored at storage location 117. When the Y designator is associated with a head entry, a current hash chain is identified. The Current Chain Element column indicates with a "Y" designator which hash table entry of a current hash chain is the current hash chain entry. The address location of the current hash chain entry can correspond to the value stored at address location 119. The Locked column of FIG. 9 indicates with an L designator which hash table entries, if any, are locked by locking circuitry 114.

In response to receiving a cleanup request, such as from instruction processing module 101, the cleanup module 104 will begin execution of a clean-up operation. A specific embodiment implementing a cleanup operation is represented by the CleanUp Pseudo Code of Table 1. According to a particular embodiment, operation of the cleanup module 104 can be decoupled from operation of the hash table management module 103 so that the hash table management module 103 only handles requests from cleanup module 104 to lock and unlock particular chains, and to remove chain entries from a chain, but otherwise has no awareness as to the state of the cleanup circuitry. In other implementations, the cleanup module 104 and the hash table management module 103 can be more tightly integrated.

TABLE 1

CleanUp Pseudo Code

```
#Set Current Scan Address to extreme physical address of hash table
1  CurrentScanAddress = HTExtremePhysicalAddress
2  LockChain(CurrentScanAddress)           #Lock entry/chain beginning at
                                           Current scan address
3  if CurrentScanAddress.HFlag == True     #Determine if Current Scan
                                           Entry is a head entry
4       then                               #Current Scan Address
                                           is valid head entry
5            Call Table2(CurrentScanAddress)  #Process Chain per Table 2
6  Endif
7  If CurrentScanAddress == EOT            # Is Current Scan address the
8       Then                               end of the Hash Table
9            UnlockChain(CurrentScanAddress)  #UnLock chain
10           return                        #CleanUp is complete
11      Else
12           UnlockChain(CurrentScanAddress)  #UnLock chain
```

TABLE 1-continued

CleanUp Pseudo Code

| | | |
|---|---|---|
| 13 | Inc(CurrentScanAddress) | #Increment Current Scan Address to next table entry |
| 14 | Endif | |
| 15 | goto line 2 | |

At line 1 of the CleanUp Pseudo Code the value of the variable CurrentScanAddress is set equal to the value of the variable HTExtremePhysicalAddress, which identifies a most extreme address of the current hash table to be handled by the Cleanup routine of Table 1. The variable HTExtremePhysicalAddress, can be provided by a call to execute the CleanUp Pseudo Code, or alternatively the CleanUp Pseudo Code can have a priori knowledge as to how to determine the value of HTExtremePhysicalAddress. By way of example, herein, the extreme physical is presumed to be the smallest address of hash table 300, presumed to be "0x00"; which can be an offset value that is added to a base value. Thus, A designator Y is shown the entry of the Current Scan Address column of FIG. 9 corresponding to address location 0x00. In another embodiment, the extreme physical address of hash table 300 can be the largest address in hash table 300.

At line 2 to the CleanUp Pseudo Code, a LockChain request is executed, causing the locking module 114 to lock the entry associated with the value of the current scan address. Furthermore, when the a LockChain request is implemented for a particular entry of the hash table that is a head entry, it is presumed by way of example that each entry of a hash chain including the head entry will also be locked. In the present example, because the current scan address, 0x00, is not a valid entry, only the entry 0x00 is marked as locked at the Locked column of FIG. 9

At Line 3 of Table 1 it is determined if the hash table entry identified by the value of CurrentScanAddress is a head entry. If so, flow continues at line 4 of the CleanUp Pseudo Code where a call is made to execute the CheainProcessing Pseudo Code of Table 2. This is can be accomplished by providing the value of CurrentScanAddress, e.g., the value of storage location 117 of the cleanup module 104, to the clean up routine, thereby identifying the head entry of a hash chain. Note that for convenience, it is presumed that the value of CurrentScanAddress. Hflag is guaranteed to be False for non-valid entries. Therefore, according to the embodiment of FIG. 9, the physical address 0x00 does not correspond to a valid hash table entry and a value of False will be returned, causing flow of CleanUp Pseudo Code to continue at line 7.

At Line 7 of Table 1 it is determined if the current scan address is an End Of Table (EOT) location, such as the last physical address of the hash table, or the last address associated with an entry of the hash table. If so, flow proceeds to line 9, where an Unlock Chain request is executed, causing the locking module 114 to unlock the entry associated with the values of the current scan address, and each entry of an associated hash chain if this entry is a head entry. Next, at line 10, flow from the CleanUp Pseudo code is complete, as indicated by the Return command.

Figure 10:
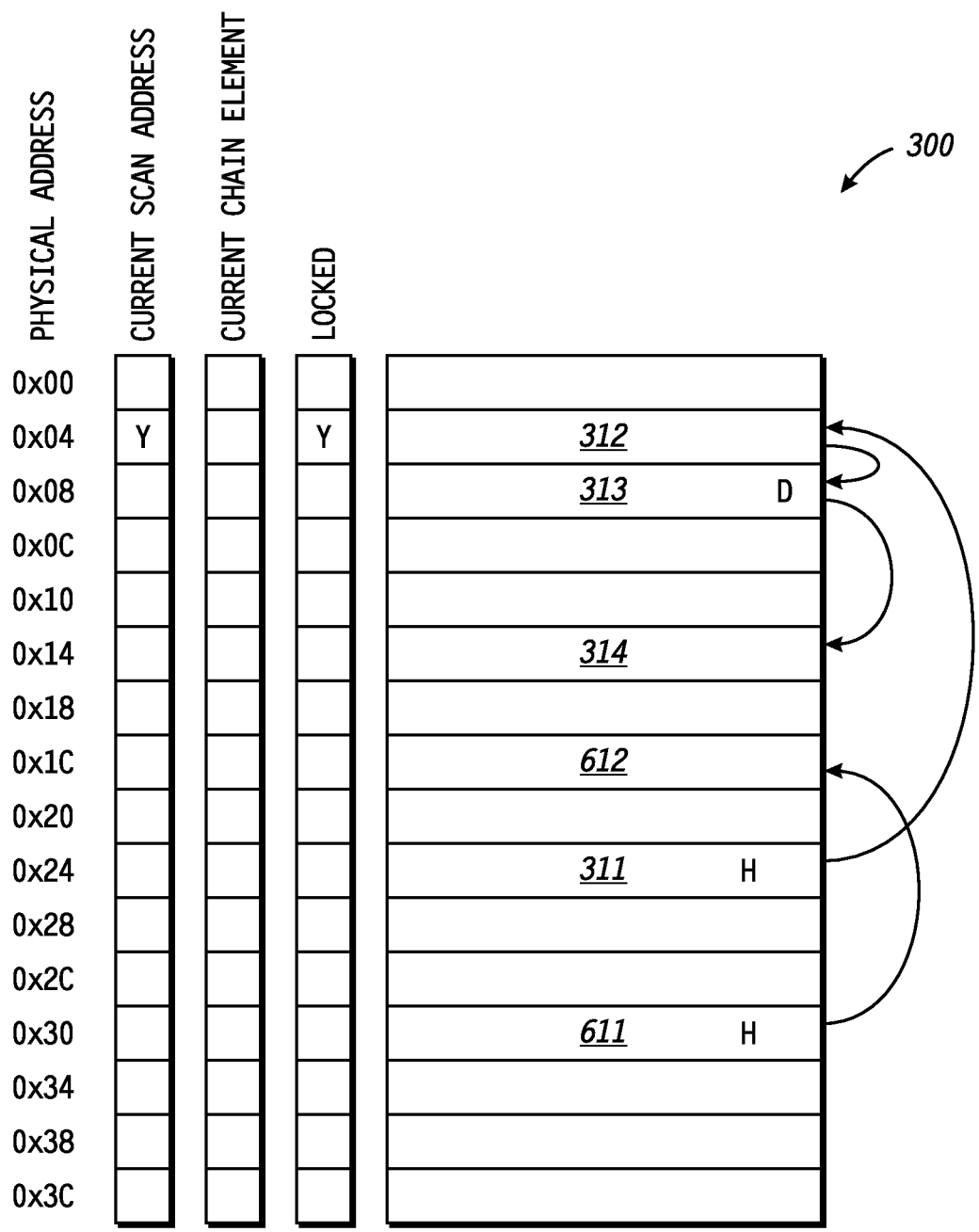
Figure 11:
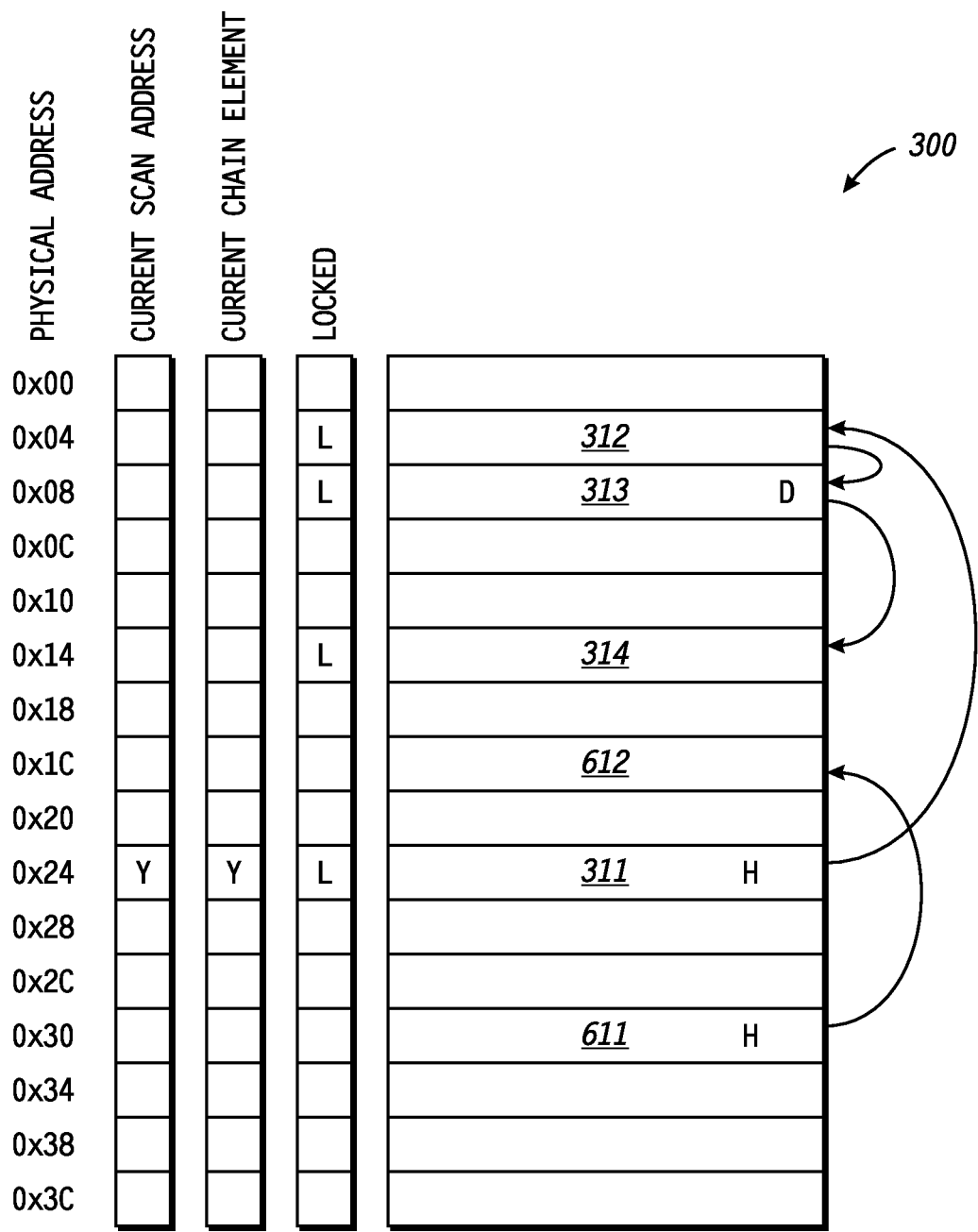

If instead at line 7 it is determined that the current scan address is not an EOT entry, flow proceeds to line 12 where an Unlock Chain request is executed, causing the locking module 114 to unlock the entry associated with the values of the current scan address, and each entry of an associated hash chain if this entry is a head entry. Next at line 13, the current scan address is incremented to the address of a next adjacent hash table entry location, e.g., the next closest storage location where an entry of the hash table can be stored, which, as illustrated at FIG. 10, is 0x04, and flow proceeds to line 15 causing the CleanUp pseudo code to return to line 2. At line 2, the LockChain continues execution as described above, causing the locking module 114 to lock the entry associated with the value of the current scan address (0x04) as illustrated at FIG. 10 by the Y designator of the Locked column. Because this entry is not a head entry, no other entries are locked, as indicated by the sole Y designator of the Locked column. Flow of Table 2 continues in a similar manner, until the current scan address is incremented to the value 0x24, which corresponds to an address of the hash table where a head entry is located.

In response to the current scan address being equal to 0x24, the LockChain command of line 2 will cause each of the four entries associated with the head entry stored at address 0x24, e.g., those entries having the hash value of 0x24, to be locked. This is illustrated in FIG. 10 by the four Y designators in the Locked column of FIG. 11. Because address 0x24 does correspond to a head entry, flow proceeds to line 5 of Table 1, which passes control to the ChainProcessing Pseudo code of Table 2, which will remove those entries from the identified hash chain that are marked for deletion, after which, flow proceeds to line 7 as previously described.

Table 2 includes pseudo code representing a ChainProcessing routine that removes deleted entries from a hash chain. At Line 1 of the ChainProcessing Pseudo Code, the value of the variable CurrentChainElement is set equal to the value of the variable CurrentScanAddress, which can be provided with the call to execute the ChainProcessing Pseudo Code. In the present example (FIG. 10), the current chain element value is 0x24, as indicated by the Current Chain Element column having the Y designator at the entry corresponding to 0x24.

TABLE 2

ChainProcessing Pseudo Code

| | | |
|---|---|---|
| 1 | CurrentChainElement = CurrentScanAddress | # Set Current Chain Element to Current Scan Address |
| 2 | If CurrentChainElement.Dflag == True | # Determine if Current Element is marked for deletion |
| 3 | Then | |
| 4 | NextChainElement = CurrentChainElement.LinkAddress | #Save pointer to next element from element being deleted |
| 5 | CurrentHeadEntry = CurrentChainElement.HashValue | |

TABLE 2-continued

| | #ChainProcessing Pseudo Code | |
|---|---|---|
| 6 | UnlockChain(CurrentHeadEntry) | #Unlock chain |
| 7 | Delete(CurrentChainElement) | # Remove Element from Chain |
| 8 | LockChain(CurrentHeadEntry) | #Lock chain |
| 9 | If NextChainElement == None | #Was deleted entry end of |
| 10 | Then | chain? |
| 11 |     Return | #Chain processing complete |
| 12 | Else | |
| 13 |     CurrentChainElement = | #Point to top of chain |
| 14 |         CurrentScanAddress | |
| 15 | Endif | |
| 16 Else | | |
| 17 | If CurrentChainElement.LinkAddr == None | #Is current entry end of chain? |
| 18 | Then | |
| 19 |     Return | #Chain processing complete |
| 20 | Else | |
| 21 |     CurrentChainElement = | #Point to next chain entry |
| 22 |         CurrentChainElement.LinkAddr | |
| 23 | Endif | |
| 24 EndIf | | |
| 25 GoTo line 2 | | #Process current chain entry |

Next, at Line 2 of Table 2 it is determined if the delete flag of the current hash chain entry is asserted. If so, flow continues at line 4. In the present example of FIG. 11, however, the current element, stored at 0x24, is not marked for deletion, and flow will proceed to Line 17 of Table 2.

Figure 12:
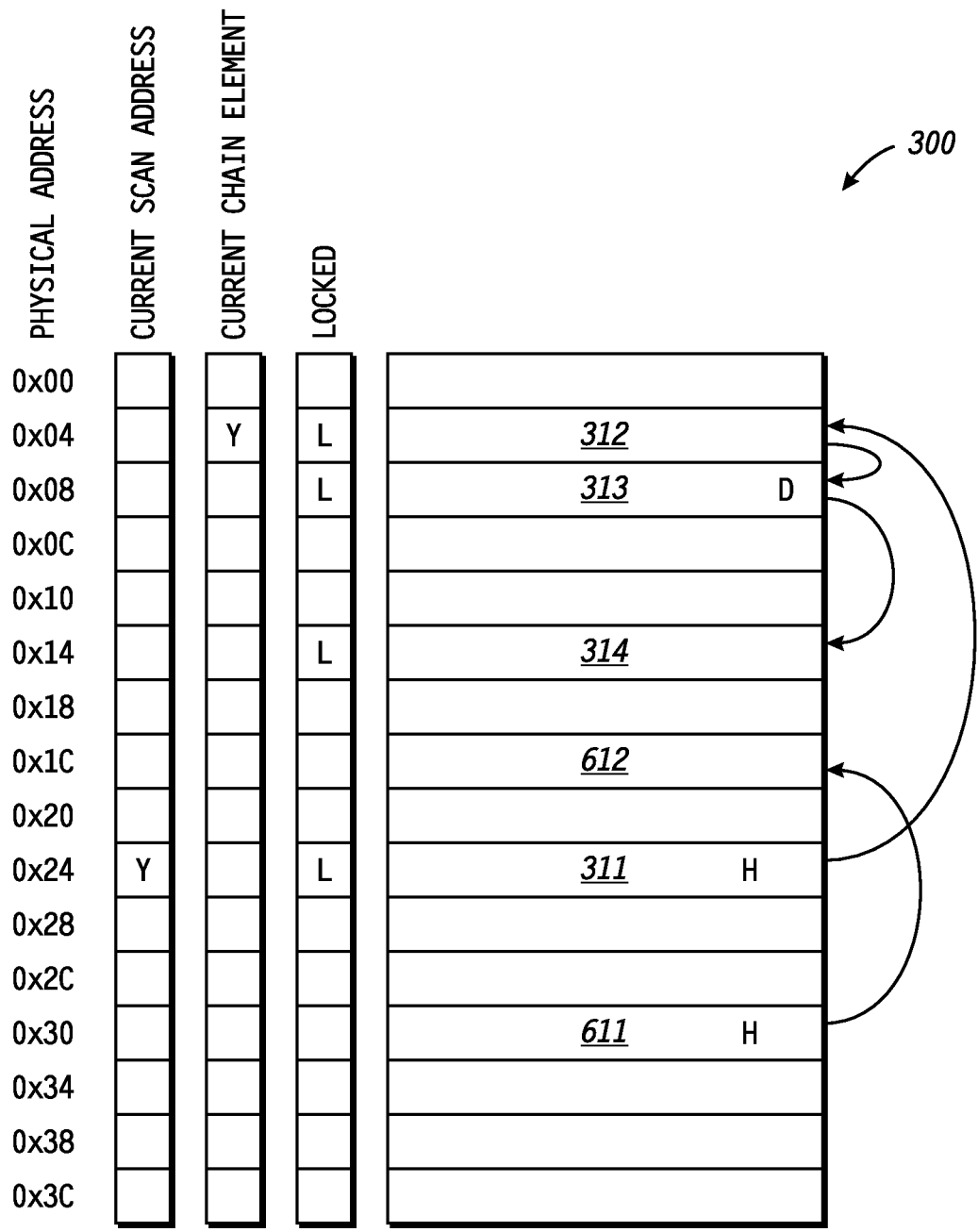

At Line 17 of Table 2 it is determined if the current chain entry is the last entry of the hash chain being processed, indicated by a designator "None". If so, flow proceeds to line 19, which ends the ChainProcessing Pseudo Code routine; otherwise, if there are more entries in the chain, flow proceeds to line 21, where the value of CurrentChainElement is set equal to the address of the next entry of the chain, which is stored at the Linked Address field of the current chain element, and flow returns to Line 2 of Table 2 via the GoTo statement at Line 25. Therefore, based upon the state information illustrated at FIG. 11, the CurrentChainElement is updated to the value 0x04, as indicated at FIG. 12, by the Current Chain Element column having a Y designator at the entry corresponding to address 0x04.

Figure 13:
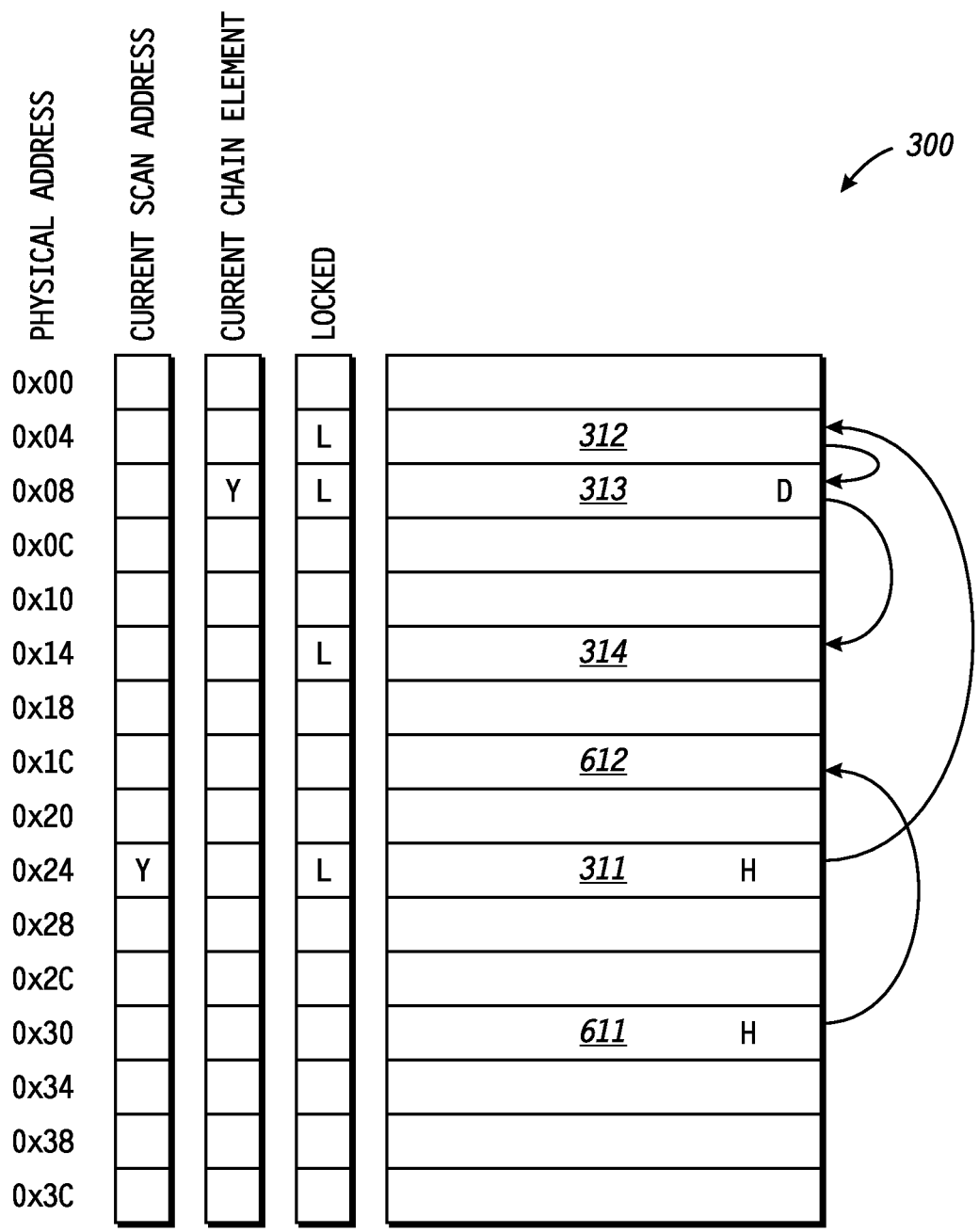

Because the entry at 0x04 is not marked for deletion, the ChainProcessing routine will proceed in the same manner as was described for entry 0x24, resulting in the CurrentChainElement being updated to the value 0x08, as indicated at FIG. 13 by the Current Chain Element column that corresponds to address 0x08 having the Y designator.

Because the entry at 0x08 is marked for deletion, the flow of the ChainProcessing routine will proceed from line 2 of Table 2 to Line 4 of Table 4, where a temporary variable NextChainElement is set equal to the Linked Address field of the current table entry. Next at line 5, the location of the current head entry, as stored at the hash value entry of the current chain entry, is stored at a variable CurrentHeadEntry. At line 6, the current hash chain is unlocked by passing the hash value, which corresponds to the address of the head entry of the chain, to the locking module 114. At line 7, a delete routine is called that removes an identified entry from the hash chain.

It will be appreciated that in addition to freeing a memory location for use by the hash table management module 103, the delete routine also performs other bookkeeping functions, such as: when the entry being deleted is the last entry of the chain, but not the head element, replacing the Linked Address field of the previous hash chain entry with the value None to indicate this entry is now the last entry of the hash chain; and when the element being deleted is a head element, and there are more than one entries in the current hash chain, the delete routine will copy the next element, identified by the link address field of the head entry being deleted, to the location of the head entry being deleted, and mark this entry as a head element. This ensures that the new head entry of the current hash chain resides at the address corresponding to the hash value.

Figure 14:
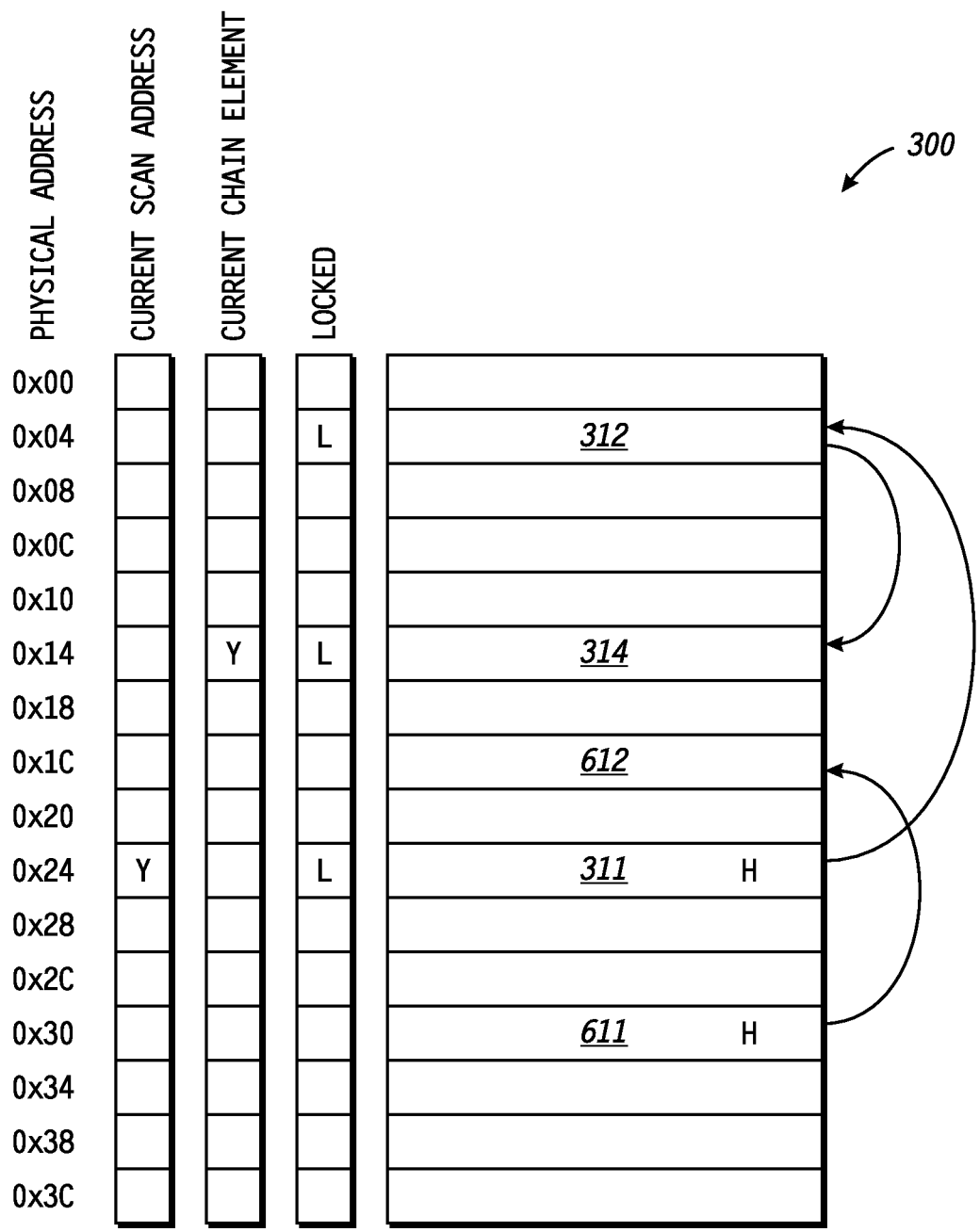
Figure 15:
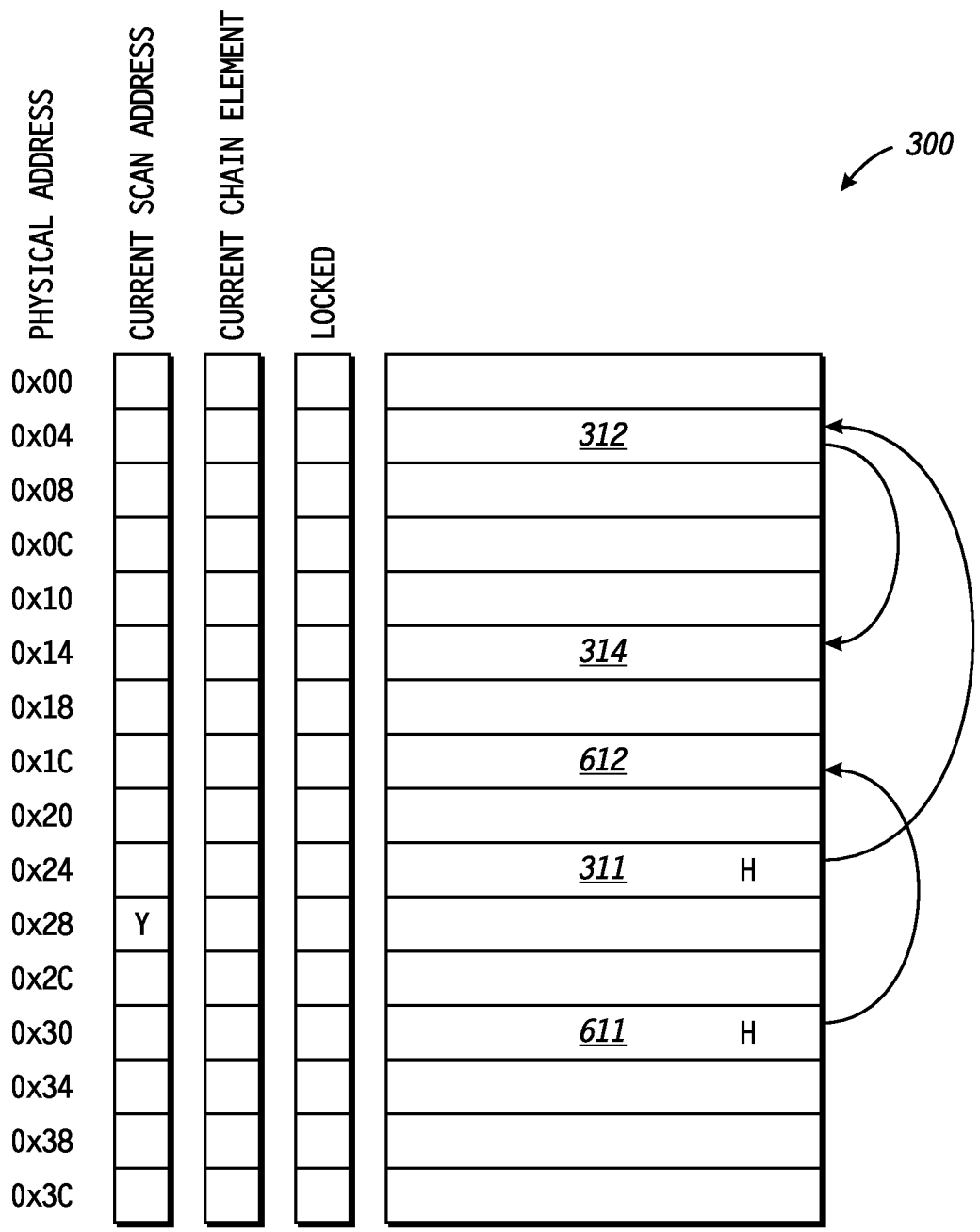
Figure 16:
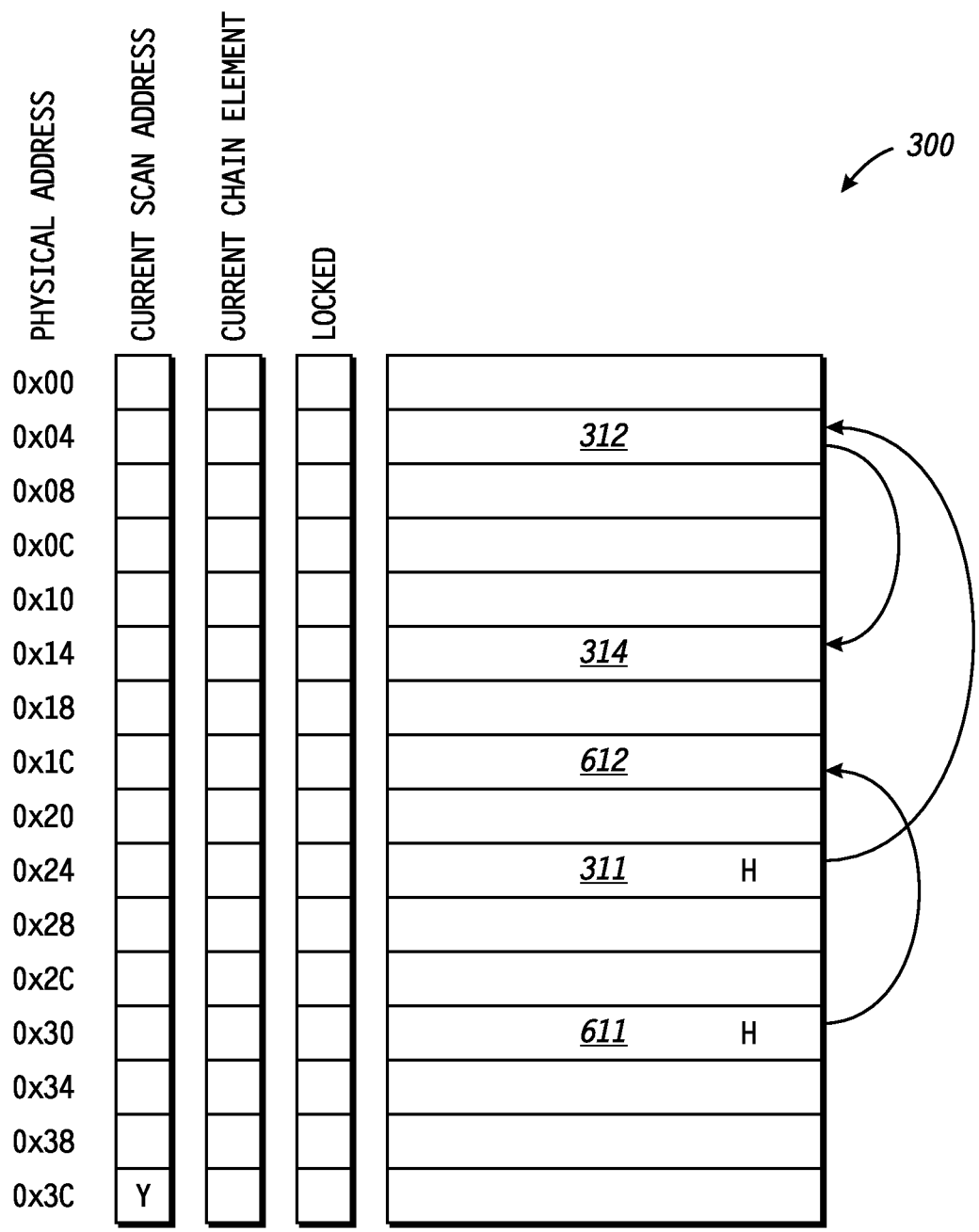

At line 8 of Table 2, the LockChain routine is called to lock the hash entry/chain associated with the value of variable CurrentHeadEntry. Note, FIG. 14 illustrates the hash table 300 after the entry at 0x08 has been removed, and the table has been scanned again so that the last entry at address 0x14 is the current hash chain entry. At line 9, it is determined if the just deleted entry was the last entry of the hash chain. If so, flow proceeds to line 11, wherein the ChainProcessing pseudo code completes execution and returns to line 7 of the flow of FIG. 1. Otherwise, if the just deleted entry was not the last entry of the hash chain, flow proceeds to line 13 of Table 2, where the current chain element is set equal to the value of the variable CurrentScanAddress, which points to the head entry of the current hash chain, and flow continues at line 25, which returns flow to line 2 of Table 2 to again determine if the current chain element should be removed from the hash chain When it is determined at line 2 that a current chain element is not marked for deletion, flow proceeds to line 17, which determines if the current chain element is the last element of the current hash chain. If so, as indicated at FIG. 14, by the Y designator of the Current Chain Element column residing at the entry correspond to address 0x14, which is the last entry of the chain, flow proceeds to line 19, causing flow to return to line 7 of the flow of Table 1. Otherwise, when the current hash table has more entries to be evaluated, the address of the variable CurrentChainElement is set equal to the link address of the current chain element, and flow proceeds at line 25 to line 2 of Table 2.

After returning to line 7 of Table 1, the CleanUp Pseudo Code will continue to increment through the hash table 300 until all hash chains of the hash table 300 have been processed. At FIG. 15, the current scan address is memory location 0x28 indicating that the CleanUP Hash Chain routine is currently evaluation memory location 0x28. At FIG. 17, the last entry of the hash table 300 is being evaluated. After which, flow of Table 1 proceeds to line 9, where the current hash chain is unlocked, and to line 10, where the CleanUp pseudo code routine is completed as indicated by the "return" command.

As discussed previously, the cleanup module 104 can in a continuous background mode, wherein the clean up module 104 is executed in a continuous loop. Whether or not the system is in continuous background mode can be programmable, e.g., by setting an indicator at a storage location. During backup mode, the "return" command at line 10 of Table 1 can be replaced with the lines of code 10a-d10f, in Table 3, below.

TABLE 3

| 10a | if ScanType == Continuous | |
|---|---|---|
| 10b | Then | |
| 10c | goto line 1 | # Repeat in continous mode |
| 10d | Else | |
| 10e | return | # End and wait for next explicit call |
| 10f | Endif | |

At line 10a of Table 3, the Cleanup Pseudo Code determines if the hash table scan type is set to continuous. The value indicating whether the scan type is "continuous" or "not continuous" can be stored at a programmable storage location, such as a register accessible by the cleanup module 104. If the scan type is continuous, flow proceeds to line 10c, where a go to statement redirects program flow to the top of the Cleanup Pseudo Code of Table 1, which again triggers the cleanup process, and flow continues. Otherwise, if the scan type is not continuous, flow proceeds to line 10e, which terminates the hash table cleanup process until a next explicit call to execute the clean up process.

It will be appreciated, when in continuous background mode, that this delay period controls how often a new scan of a hash table begins. Thus, depending upon a particular embodiment, one or more of the following delays can be implemented: 1) a delay between incrementing a current address to identify a next linear address of the hash table; 2) a delay between evaluating adjacent hash table entries of a hash chain; 3) a delay at the end of each hash chain being evaluated; and 4) a delay at the end of each hash table being fully evaluated, before re-evaluating the hash table.

The preceding description in combination with the Figures was provided to assist in understanding the teachings disclosed herein. The discussion focused on specific implementations and embodiments of the teachings. This focus was provided to assist in describing the teachings, and should not be interpreted as a limitation on the scope or applicability of the teachings. Therefore, other embodiments, uses, and advantages of the disclosure will be apparent to those skilled in the art from consideration of the specification and practice of the disclosure disclosed herein.

The term module as used herein is intended to include circuitry that can be a state machine that does not include an instruction processor, an instruction processor and a memory circuit that is configured to store a set of instructions and information to implement a particular module, the like, and combinations thereof.

While a particular embodiment stores the hash table in contiguously linear physical address space, according to another embodiment, the hash table can be stored in contiguously linear logical address space that is mapped to non-contiguous physical address space. Each of the features illustrated in FIG. 1 are implemented as an integrated circuit design that can reside at a single integrated circuitry die.

In another embodiment, the data processing system is a multiprocessor module having additional instruction processing modules of the same or different type as instruction processing module 101. In such an embodiment, the memory module 102 can be accessed by each one of the instruction processing modules, and the hash table management module and the clean-up circuitry can be global resources that receive request regarding hash tables from each of the plurality of instruction processing modules.

The functions of the various modules described herein are implemented by circuitry that can be readily generated using well known logic synthesis techniques, based on programming languages that implement the pseudo code described herein. The resulting circuits include can include combinational logic, storage devices, the like, and combinations thereof for example to implement a state machine to implement a particular operation. In addition to non-instruction-based circuitry, the circuitry used to implement the functions can also include an instruction-based data processor, such as processing module 101, or other processor, that accesses and executes instructions from a memory circuit to implement the various features.

Hash table management module 103 can operate as an independent entity from the cleanup module 104, as described previously with respect to background mode, thus cleanup module submit lock and unlock request to the hash table management module 103. It will be further appreciated that in another embodiment, the removal of hash table entries described as being performed by delete processing module 121 can be performed by submitting a remove request to the control module 112 of the hash table management module 103. For example, according to an embodiment, the control module 112 can support a RemoveElement request that performs all of the overhead associated with removing a deleted element from a hash chain. In such an embodiment, a single operation, RemoveElement(CurrentChainElement), can be implanted at the chain processing pseudo code of Table 1 instead of the UnlockChain, Delete, and LockChain operations at lines 6-8 of Table 2. According to this embodiment, the control module 112 will submit a job request, which when it reaches the head of the job queue will unlock the relevant chain, remove the entry, and re-lock the hash chain, all as part of the same job request.

It will be further appreciated that in other embodiments it may be possible to unlock individual entries of a hash chain, as opposed to the entire hash chain, when removing an entry from a hash chain.

In a first aspect of the disclosure herein, a system can include a memory configured to store a hash table in linear address space defined by a first extreme address and a second extreme, the hash table having a plurality of hash entry locations; a hash table management circuit configured to create hash entries at the hash entry locations, wherein each created hash entry that has a unique hash value is marked as a head entry that is an initial entry of a hash chain, and each created hash entry that has the same hash value as an existing hash chain is linked to the existing hash chain; a hash table cleanup circuit configured to, upon receiving a cleanup request, identify each head entry sequentially in linear address order, and to remove all hash entries from the hash chain associated with the currently identified head entry that have been marked for deletion before identifying the next head entry.

In one embodiment of the first aspect, the hash table cleanup circuit is to store the first extreme address at a first storage location that identifies a current hash entry location, and is to increment the current hash entry location stored at the first storage location to identify each head entry marked as a head entry in sequential linear address order. In a particular embodiment, the hash table cleanup circuit is to store an address of the currently identified head entry at a second storage location that identifies the location of a current hash chain, and is to sequentially update the current hash chain location stored at the second location based upon linking information of the hash chain. In another particular embodiment, the first extreme address is a smallest physical address of the hash table and the second extreme address is a largest physical address of the hash table. In yet another particular embodiment, the first extreme address is a largest physical address of the hash table, and the second extreme address is a smallest physical address of the hash table.

In yet another embodiment of the first aspect, the hash table cleanup circuit is further to delay for a time period between increments of the first storage location. In a particular embodiment, an instruction processor configured to store a value at a second storage location that stores information indicating the time period.

In yet a further embodiment of the first aspect, the hash table management circuit is to further lock each entry of a hash chain based upon a lock request of an entity to prevent modification, and the hash table cleanup circuit is to provide the lock request to the hash table management circuit to lock the hash chain prior to removing hash entries from the hash chain. In a particular embodiment, the hash table cleanup circuit is to further provide a request to the hash table management circuit to unlock the hash chain of the identified head entry prior to removing each hash entries from the hash chain, and to request the hash table management circuit to lock the hash chain subsequent to removing each hash entry before identifying a next head entry.

In still another embodiment of the first aspect, an instruction processing circuit coupled to the hash table cleanup circuit to provide the cleanup request.

In a second aspect, a method can include generating a plurality of hash chains at a hash table of a data processor, each hash chain having a unique hash value, including a first hash chain and a second hash chain, each hash chain of the plurality of hash chains having a plurality of hash table entries; calculating a hash value, at a memory controller of a data processor system, for a new hash table entry based upon first information; sequentially evaluating physical addresses of the hash table to determine if a physical address being evaluated stores a head entry of a hash chain, including locking each physical address, and its associated hash chain entries, prior to determining the head entry is stored; in response to determining the physical address being evaluated stores the head entry of a hash chain (a current hash chain): unlocking the current hash chain; removing, by a cleanup routine, each hash table entry of the current hash chain; and subsequent to removing each hash table entry marked for deletion, locking the current hash chain.

In an embodiment of the first aspect, the method includes, wherein sequentially evaluating the physical addresses of the hash table further comprises: storing an extreme address of the hash table at a first storage location; incrementing the physical address stored at the first storage location to step through a plurality of hash table entry locations of the table in linear sequential order; evaluating each physical address stored at the first storage location by: reading information from the hash table based upon the value stored at the first storage location; and determining whether the physical address being evaluated stores a head entry based upon the information. In a particular embodiment the extreme address is a smallest physical address of the hash table. In another particular embodiment, the extreme address is a largest physical address of the hash table. In a further particular embodiment, sequentially evaluating further includes: waiting for a time period between before incrementing the physical address), wherein the predetermined time period is programmable. In a further particular embodiment, removing each hash table entry of the current hash chain includes: sequentially storing the physical address of each entry of the current hash chain at a first storage location to step through a plurality of hash table entry locations of the table in linked order, and for each physical address: reading information from the hash table based upon the value stored at the first storage location; and determining if the value of the first storage location corresponds to a hash table entry that is marked for deletion based upon the information, and removing the hash table entry from the hash chain if it is marked for deletion, otherwise leaving the hash table entry in the hash chain.

In another embodiment of the second aspect, sequentially storing the physical address of each entry of the current hash chain at a first storage location to step through a plurality of hash table entry locations of the table in linked order, and for each physical address: reading information from the hash table based upon the value stored at the first storage location; and determining if the value of the first storage location corresponds to a hash table entry that is marked for deletion based upon the information, and removing the hash table entry from the hash chain if it is marked for deletion, otherwise leaving the hash table entry in the hash chain.

In a third aspect, a method can include: in response to a request to cleanup a hash table of a data processor device, setting a current address to be an extreme address of the hash table; incrementing a current address in linear sequential order from the first extreme address of the hash table to the second extreme address of the hash table to step through a plurality of hash table address entry locations; processing each entry location, before each increment of the current address, by: requesting that all hash table entries associated with the current address be locked to prevent modification; if a head entry is stored at the current address, stepping through each entry of a hash chain associated with the head entry and removing those entries of the hash chain that are marked for deletion, wherein removing an entry comprises requesting that all hash table entries associated with the current address be unlocked to allow modification, removing the entry from the hash chain, and requesting that all hash table entries associated with the current address be locked, otherwise, if the head entry is not stored at the current address, requesting that all hash table entries associated with the current address be unlocked to allow modification. In one embodiment of the third aspect waiting a time period before each increment of the current address. In a more particular embodiment, the time period is programmable.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

What is claimed is:

1. A data processing system, comprising:
a memory configured to store a hash table in linear address space defined by a first extreme address and a second extreme address, the hash table having a plurality of hash entry locations;
a hash table management circuit configured to create hash entries at the hash entry locations, wherein each created hash entry that has a unique hash value is marked as a head entry that is an initial entry of a hash chain, and each created hash entry that has the same hash value as an existing hash chain is linked to the existing hash chain;
a hash table cleanup circuit configured to, upon receiving a cleanup request, identify each head entry sequentially in linear address order, and to remove all hash entries from the hash chain associated with the currently identified head entry that have been marked for deletion before identifying the next head entry, wherein the hash table cleanup circuit is to store the first extreme address at a first storage location that identifies a current hash entry location, and is to increment the current hash entry location stored at the first storage location to identify each head entry marked as a head entry in sequential linear address order.

2. The data processing system of claim 1, wherein the hash table cleanup circuit is to store an address of the currently identified head entry at a second storage location that identifies the location of a current hash chain, and is to sequentially update the current hash chain location stored at the second location based upon linking information of the hash chain.

3. The data processing system of claim 1, wherein the first extreme address is a smallest physical address of the hash table and the second extreme address is a largest physical address of the hash table.

4. The data processing system of claim 1, wherein the first extreme address is a largest physical address of the hash table, and the second extreme address is a smallest physical address of the hash table.

5. The data processing system of claim 1, wherein the hash table cleanup circuit is further to delay for a time period between increments of the first storage location.

6. The data processing system of claim 5, further comprising an instruction processor configured to store a value at a second storage location that stores information indicating the time period.

7. The data processor system of claim 1, further comprising:
an instruction processing circuit coupled to the hash table cleanup circuit to provide the cleanup request.

8. A data processing system, comprising:
a memory configured to store a hash table in linear address space defined by a first extreme address and a second extreme address, the hash table having a plurality of hash entry locations;
a hash table management circuit configured to create hash entries at the hash entry locations, wherein each created hash entry that has a unique hash value is marked as a head entry that is an initial entry of a hash chain, and each created hash entry that has the same hash value as an existing hash chain is linked to the existing hash chain;
a hash table cleanup circuit configured to, upon receiving a cleanup request, identify each head entry sequentially in linear address order, and to remove all hash entries from the hash chain associated with the currently identified head entry that have been marked for deletion before identifying the next head entry;
wherein the hash table management circuit is to further lock each entry of a hash chain based upon a lock request of an entity to prevent modification, and the hash table cleanup circuit is to provide the lock request to the hash table management circuit to lock the hash chain prior to removing hash entries from the hash chain, and
wherein the hash table cleanup circuit is to further provide a request to the hash table management circuit to unlock the hash chain of the identified head entry prior to removing each hash entries from the hash chain, and to request the hash table management circuit to lock the hash chain subsequent to removing each hash entry before identifying a next head entry.

9. A method, comprising:
generating a plurality of hash chains at a hash table of a data processor, each hash chain having a unique hash value, including a first hash chain and a second hash chain, each hash chain of the plurality of hash chains having a plurality of hash table entries;
calculating a hash value, at a memory controller of a data processor system, for a new hash table entry based upon first information;
sequentially evaluating physical addresses of the hash table to determine if a physical address being evaluated stores a head entry of a hash chain, including locking each physical address, and its associated hash chain entries, prior to determining the head entry is stored;
in response to determining the physical address being evaluated stores the head entry of a current hash chain:
unlocking the current hash chain;
removing, by a cleanup routine, each hash table entry marked for deletion of the current hash chain; and
subsequent to removing each hash table entry marked for deletion, locking the current hash chain.

10. The method of claim 9, wherein sequentially evaluating the physical addresses of the hash table further comprises:
storing an extreme address of the hash table at a first storage location as a physical address;
incrementing the physical address stored at the first storage location to step through a plurality of hash table entry locations of the table in linear sequential order;
evaluating each physical address stored at the first storage location by:
reading information from the hash table based upon the value stored at the first storage location; and
determining whether the physical address being evaluated stores a head entry based upon the information.

11. The method of claim 10, wherein the extreme address is a smallest physical address of the hash table.

12. The method of claim 10, wherein the extreme address is a largest physical address of the hash table.

13. The method of claim 10, wherein sequentially evaluating further comprises:
    waiting for a predetermined time period between before incrementing the physical address, wherein the predetermined time period is programmable.

14. The method of claim 10, wherein removing each hash table entry of the current hash chain comprises:
    sequentially storing the physical address of each entry of the current hash chain at a second storage location to step through a plurality of hash table entry locations of the table in linked order, and for each physical address:
    reading information from the hash table based upon the value stored at the second storage location; and
    determining if the value of the second storage location corresponds to a hash table entry that is marked for deletion based upon the information, and removing the hash table entry from the hash chain if it is marked for deletion, otherwise leaving the hash table entry in the hash chain.

15. The method of claim 9, wherein removing each hash table entry of the current hash chain comprises:
    sequentially storing the physical address of each entry of the current hash chain at a first storage location to step through a plurality of hash table entry locations of the table in linked order, and for each physical address:
    reading information from the hash table based upon the value stored at the first storage location; and
    determining if the value of the first storage location corresponds to a hash table entry that is marked for deletion based upon the information, and removing the hash table entry from the hash chain if it is marked for deletion, otherwise leaving the hash table entry in the hash chain.

16. A method comprising:
    in response to a request to cleanup a hash table of a data processor device, setting a current address to be a first extreme address of the hash table;
    incrementing the current address in linear sequential order from the first extreme address of the hash table to a second extreme address of the hash table to step through a plurality of hash table address entry locations;
    processing each entry location, before each increment of the current address, by:
        requesting that all hash table entries associated with the current address be locked to prevent modification;
        if a head entry is stored at the current address, stepping through each entry of a hash chain associated with the head entry and removing those entries of the hash chain that are marked for deletion, wherein removing an entry comprises requesting that all hash table entries associated with the current address be unlocked to allow modification, removing the entry from the hash chain, and requesting that all hash table entries associated with the current address be locked, otherwise, if the head entry is not stored at the current address, requesting that all hash table entries associated with the current address be unlocked to allow modification.

17. The method of claim 16 further comprising waiting a time period before each increment of the current address.

18. The method of claim 17, wherein the time period is programmable.

* * * * *